(12) United States Patent
Konno

(10) Patent No.: US 9,983,798 B2
(45) Date of Patent: May 29, 2018

(54) INFORMATION PROCESSING APPARATUS AND DATA ACCESSING METHOD

(71) Applicant: FUJITSU LIMITED, Kawasaki-shi, Kanagawa (JP)

(72) Inventor: Hiroki Konno, Kurokawa (JP)

(73) Assignee: FUJITSU LIMITED, Kawasaki (JP)

(*) Notice: Subject to any disclaimer, the term of this patent is extended or adjusted under 35 U.S.C. 154(b) by 57 days.

(21) Appl. No.: 15/174,682

(22) Filed: Jun. 6, 2016

(65) Prior Publication Data

US 2016/0370999 A1 Dec. 22, 2016

(30) Foreign Application Priority Data

Jun. 16, 2015 (JP) .................................. 2015-121154

(51) Int. Cl.
*G06F 12/00* (2006.01)
*G06F 3/06* (2006.01)
*G06F 12/0802* (2016.01)

(52) U.S. Cl.
CPC ............ *G06F 3/061* (2013.01); *G06F 3/0604* (2013.01); *G06F 3/0647* (2013.01); *G06F 3/0683* (2013.01); *G06F 12/0802* (2013.01); *G06F 2212/60* (2013.01)

(58) Field of Classification Search
CPC ...... G06F 3/061; G06F 3/0604; G06F 3/0647; G06F 3/0683; G06F 12/0802; G06F 2212/60
See application file for complete search history.

(56) References Cited

U.S. PATENT DOCUMENTS

| 6,148,377 A * | 11/2000 | Carter .................. G06F 9/5016 707/E17.12 |
| 2010/0217938 A1* | 8/2010 | Schneider ........... G06F 12/0802 711/141 |
| 2014/0359211 A1* | 12/2014 | Bisht ................... G06F 12/0866 711/113 |

FOREIGN PATENT DOCUMENTS

| JP | 2011-203995 A | 10/2011 |
| JP | 2013-003934 A | 1/2013 |

* cited by examiner

*Primary Examiner* — Shawn X Gu
(74) *Attorney, Agent, or Firm* — Arent Fox LLP

(57) ABSTRACT

An information processing apparatus includes a first memory including a first portion and a second portion, the first portion including a plurality of regions, and a processor configured to read first data stored in a first region of the plurality of regions, move the first data stored in the first region to a second region, generate management data indicating that the first data is moved to the second region, store the management data in the second portion of the first memory, obtain information indicating a relation between the first data and location of the management data in the first memory, in response to a request to read the first data stored in the second region, access the management data based on the information, and read the first data stored in the second region.

18 Claims, 33 Drawing Sheets

FIG. 6

|  | COUNT VALUE |
|---|---|
| TARGET DATA TD-1 | 51 |
| TARGET DATA TD-2 | 16 |
| TARGET DATA TD-3 | 39 |
| TARGET DATA TD-4 | 14 |
| TARGET DATA TD-5 | 32 |
| TARGET DATA TD-6 | 11 |

FIG. 8

|  | PRIORITY ACCESS FLAG | PROVISIONAL PRIORITY | COUNT VALUE |
|---|---|---|---|
| TARGET DATA TD-1 | 0 | 2 | 18 |
| TARGET DATA TD-2 | 1 | 2 | 12 |
| TARGET DATA TD-3 | 0 | 1 | 14 |
| TARGET DATA TD-4 | 1 | 1 | 8 |
| TARGET DATA TD-5 | 0 | 2 | 14 |
| TARGET DATA TD-6 | 1 | 2 | 15 |

FIG. 23

| TIME ZONE | CS CALL | PS CALL | HO CALL | FEATURE |
|---|---|---|---|---|
| 5:00 TO 9:00 | MEDIUM | MEDIUM | MEDIUM | CS CALL, PS CALL AND HO CALL INCREASE EQUALLY |
| 9:00 TO 17:00 | MEDIUM | MEDIUM | LOW | CS CALL AND PS CALL INCREASE EQUALLY, AND HO CALL INCREASES SIGNIFICANTLY |
| 17:00 TO 20:00 | MEDIUM | MEDIUM | MEDIUM | CS CALL, PS CALL AND HO CALL INCREASE EQUALLY |
| 20:00 TO 23:00 | MEDIUM | HIGH | LOW | PS CALL INCREASES SIGNIFICANTLY, AND CS CALL AND HO CALL DECREASE |

FIG. 24

| TIME ZONE | CS CALL | PS CALL | HO CALL |
|---|---|---|---|
| 5:00 TO 9:00 | | | PREFERENTIAL ACCESS |
| 9:00 TO 17:00 | PREFERENTIAL ACCESS | PREFERENTIAL ACCESS | |
| 17:00 TO 20:00 | PREFERENTIAL ACCESS | PREFERENTIAL ACCESS | |
| 20:00 TO 23:00 | | PREFERENTIAL ACCESS | |

INFORMATION PROCESSING APPARATUS AND DATA ACCESSING METHOD

CROSS-REFERENCE TO RELATED APPLICATION

This application is based upon and claims the benefit of priority of the prior Japanese Patent Application No. 2015-121154, filed on Jun. 16, 2015, the entire contents of which are incorporated herein by reference.

FIELD

The embodiments discussed herein are related to an information processing apparatus and a data accessing method.

BACKGROUND

A processor that executes a process by accessing data stored in a storage device provided with a plurality of regions for storing data has been known. The processor stores a data group in a region group, holds information indicating the region group, and accesses data included in the data group, based on the held information.

For example, in a case where a plurality of pieces of data which are accessed at a relatively high frequency are stored in a plurality of continuous regions, the processor is likely to rapidly access the data. Therefore, the plurality of pieces of data which are accessed at a relatively high frequency are stored in advance in the plurality of continuous regions in the storage device.

Examples of the related art are Japanese Laid-open Patent Publication No. 2011-203995 and Japanese Laid-open Patent Publication No. 2013-3934.

SUMMARY

According to an aspect of the invention, an information processing apparatus includes a first memory including a first portion and a second portion, the first portion including a plurality of regions, and a processor coupled to the first memory and configured to read first data stored in a first region of the plurality of regions of the first memory, store the first data in the second memory, move the first data stored in the first region to a second region of the plurality of regions, generate management data indicating that the first data is moved to the second region of the plurality of regions, store the management data in the second portion of the first memory, obtain information indicating a relation between the first data and location of the management data in the first memory, in response to a request to read the first data stored in the second region, access the management data based on the information, and read the first data stored in the second region.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a table representing an example of a count value for each piece of target data.

FIG. 8 is a table representing an example of a priority access flag, a provisional priority, and a count value, for each piece of target data.

FIG. 23 is a table representing an example of feature of a change in the count of CS calls, the count of PS calls, and the count of HO calls of FIG. 19.

FIG. 24 is a table representing an example of a priority access flag associated with the change in the count of CS calls, the count of PS calls, and the count of HO calls of FIG. 19.

DESCRIPTION OF EMBODIMENTS

Figure 1:
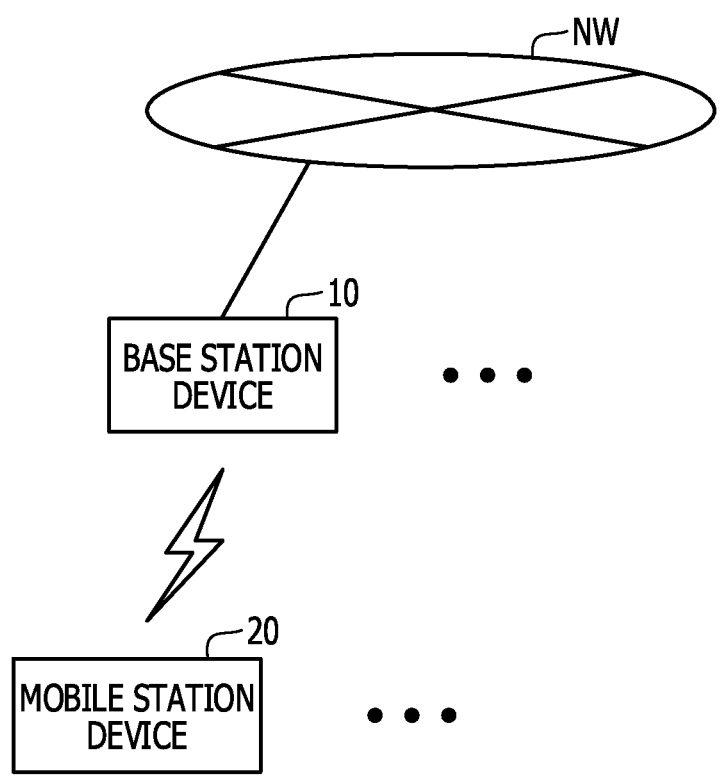
FIG. 1 illustrates an example of a configuration of a wireless communication system of a first embodiment.

The frequency of accessing each piece of data may vary with the lapse of time. For example, in a base station device including a processor and a storage device, the frequency of accessing data used for communication with a mobile station device is likely to vary with the lapse of time.

However, information indicating a region group in which a data group is stored is determined in advance. For example, the information indicating the region group in which the data group is stored is set, when a program executed by the processor is generated. Accordingly, if a region for storing data is changed, the processor may not appropriately access the data. In this way, the processor may not change the region for storing data, depending on the frequency of accessing the data. Therefore, the processor may not rapidly access the data.

Hereinafter, embodiments will be described with reference the drawings. Here, the embodiments described below are examples. Therefore, it is not excluded that various modifications and techniques that are not explicitly described below are applied to the embodiments. In addition, in the drawings used in the embodiments below, parts denoted by the same reference numerals represent the same or like parts, as long as modifications or variations are not explicitly described.

First Embodiment (Configuration)

FIG. 1 illustrates an example of a configuration of a wireless communication system of a first embodiment. For example, as illustrated in FIG. 1, the wireless communication system 1 of the first embodiment includes a plurality of base station devices 10, and a plurality of mobile station devices 20. The number of base station devices 10 included in the wireless communication system 1 may be 1. The number of mobile station devices 20 included in the wireless communication system 1 may be 1.

The wireless communication system 1 performs communication according to a predetermined communication scheme. In this example, the communication scheme is LTE scheme. LTE is the abbreviation for Long Term Evolution. In addition, the communication scheme may be a scheme (for example, a scheme such as a LTE-Advanced) other than the LTE scheme.

The base station device 10 forms a cell. In addition, the base station device 10 may form a plurality of cells. The cell is an example of a wireless area. The wireless area may be represented as a coverage area or a communication area. For example, a cell may be a macro cell, a micro cell, a nanocell, a picocell, a femtocell, a home cell, a small cell, a sector cell or the like.

The base station device 10 wirelessly communicates with a mobile station device 20 located in the cell that the base station device 10 forms.

In this example, the base station device 10 provides radio resources in the cell that the base station device 10 forms. In this example, the radio resource is identified by time and frequency. The base station device 10 communicates with the mobile station device 20 located in the cell that the base station device 10 forms, using radio resources provided in the cell.

The base station device 10 may be represented as a base station, an Evolved Node B (eNB), a wireless device, or a wireless communication device.

In this example, the base station device 10 is communicatively coupled to a communication network (for example, a core network) NW. The interface between the base station device 10 and the communication network NW may be represented as an S1 interface. Furthermore, the interface between the base station devices 10 may be represented as an X2 interface.

The portion of the communication network NW (in other words, a higher layer) side rather than the base station device 10 in the wireless communication system 1 may be represented as the EPC. EPC is abbreviated as Evolved Packet Core. A portion which is formed by the base station device 10 in the wireless communication system 1 may be represented as E-UTRAN. E-UTRAN is an abbreviation of Evolved Universal Terrestrial Radio Access Network.

The mobile station device 20 communicates with the base station device 10 that forms the cell, using the radio resources provided in the cell where the mobile station device 20 is located. Incidentally, the mobile station device 20 may be represented as a wireless terminal, a wireless device, or a user equipment (UE).

(Configuration; Base Station Device)

Figure 2:
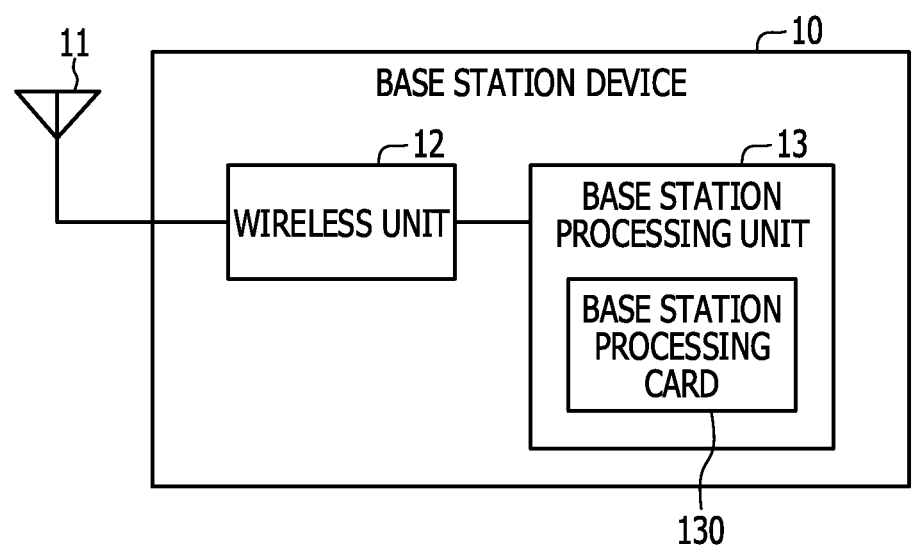
FIG. 2 illustrates an example of a configuration of a base station device in FIG. 1.

Next, the configuration of the base station device 10 will be described. FIG. 2 illustrates an example of a configuration of a base station device of FIG. 1. For example, as illustrated in FIG. 2, the base station device 10 includes an antenna 11, a wireless unit 12, and a base station processing unit 13.

The wireless unit 12 transmits and receives wireless signals having a radio frequency, with the mobile station device 20 located in the formed cell, through the antenna 11. The wireless unit 12 converts the wireless signals that are transmitted and received through the antenna 11 into baseband signals having a lower baseband than the radio frequency. The wireless unit 12 outputs the converted baseband signal to the base station processing unit 13.

Further, the baseband signal is input to the wireless unit 12, from the base station processing unit 13. The wireless unit 12 converts the baseband signal that is input from the base station processing unit 13 into the wireless signal, and transmits the converted wireless signal through the antenna 11. The function of the wireless unit 12 may be implemented by large scale integration (LSI).

The baseband signal is input to the base station processing unit 13, from the wireless unit 12. The base station processing unit 13 processes the baseband signal that is input from the wireless unit 12. Further, the base station processing unit 13 transmits and receives data with another device (for example, another base station device 10, a server not shown which is coupled to the communication network NW, or the like).

In addition, the base station processing unit 13 generates a baseband signal. For example, the baseband signal may be generated based on at least one of the baseband signal which is input from the wireless unit 12, and data which is received from other devices. The base station processing unit 13 outputs the generated baseband signal to the wireless unit 12.

In this example, the base station processing unit 13 includes a base station processing card 130 which is detachably provided. In addition, the base station processing card 130 may be represented as a base station processing board or a base station processing adapter. The number of base station processing cards 130 provided in the base station processing unit 13 may be two or more.

Figure 3:
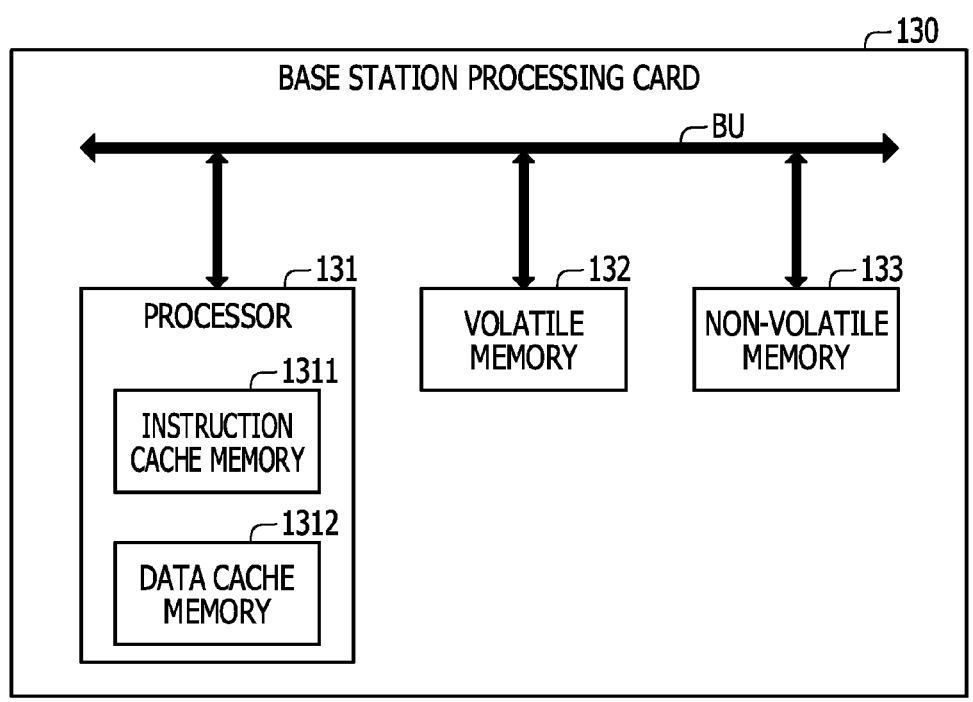
FIG. 3 illustrates an example of a configuration of a base station processing card in FIG. 2.

FIG. 3 illustrates an example of the configuration of the base station processing card in FIG. 2. For example, as illustrated in FIG. 3, the base station processing card 130 includes a processor 131, a volatile memory 132, and a non-volatile memory 133, which are coupled through a bus BU.

The processor 131 includes an instruction cache memory 1311, and a data cache memory 1312. The instruction cache memory 1311 stores an instruction to process data. The data cache memory 1312 stores data. In addition, the base station processing card 130 may include the instruction cache memory 1311 and the data cache memory 1312 outside of the processor 131.

For example, the processor 131 is a central processing unit (CPU). Incidentally, the processor 131 may be a digital signal processor (DSP).

The volatile memory 132 has a plurality of the regions for storing data or instructions. In this example, the volatile memory 132 is a random access memory (RAM). In addition, the volatile memory 132 may be a different volatile memory from a RAM. The volatile memory 132 is an example of a storage device.

In this example, the non-volatile memory 133 is a flash memory. In addition, the non-volatile memory 133 may be a different non-volatile memory from the flash memory.

The processor 131 controls each unit of the base station device 10, by executing the program stored in the non-volatile memory 133, using the volatile memory 132, the instruction cache memory 1311, and the data cache memory 1312.

The program includes a data group, and an instruction group for processing the data group. The program may be represented as, for example, an execution file, an executable file, or a file having an executable-format.

The processor 131 stores the data group and the instruction group which were stored in the non-volatile memory 133, in the volatile memory 132. The processor 131 sequentially reads a plurality of instructions included in the instruction group which is stored in the volatile memory 132 or the instruction cache memory 1311, and processes the instruction.

If the instruction to be processed is stored in the instruction cache memory 1311, the processor 131 reads the instruction stored in the instruction cache memory 1311. If the instruction to be processed is not stored in the instruction cache memory 1311, the processor 131 reads the instruction stored in the volatile memory 132, and stores a new instruction group including the instruction stored in the volatile memory 132 to the instruction cache memory 1311.

The new instruction group which is stored in the instruction cache memory 1311 in accordance with the reading of an instruction includes the instruction and at least one instruction which is stored in the region that stores the instruction and regions which are continuous with the region, in the volatile memory 132. The new instruction group, which is stored in the instruction cache memory 1311 in accordance with the reading of the instruction, has a predetermined size.

In a case where the new instruction group is stored in the instruction cache memory 1311, the processor 131 erases the earliest stored instruction group from the instruction cache memory 1311, when the instruction cache memory 1311 has an insufficient region for storing the new instruction group.

In a case where an instruction represents the generation of the access request for data, the processor 131 accesses the data which is stored in the volatile memory 132 or the data cache memory 1312. In this example, the access to the data includes reading of data or writing of data. In this example, the access request is a read request for data reading or a write request for data writing.

In a case where data to be accessed is stored in the data cache memory 1312, the processor 131 accesses the data stored in the data cache memory 1312. In a case where data to be accessed is not stored in the data cache memory 1312, the processor 131 accesses the data stored in the volatile memory 132. Further, in this case, the processor 131 stores a new data group including the data stored in the volatile memory 132 to the data cache memory 1312.

The new data group which is stored in the data cache memory 1312 in accordance with the access to data includes the data and at least one piece of data which is stored in the region that stores the data and regions which are continuous with the region, in the volatile memory 132. The new data group, which is stored in the data cache memory 1312 in accordance with the access to data, has a predetermined size.

In a case where the new data group is stored in the data cache memory 1312, the processor 131 erases the earliest stored data group from the data cache memory 1312, when the data cache memory 1312 has an insufficient region for storing the new data group.

(Function)

Figure 4:
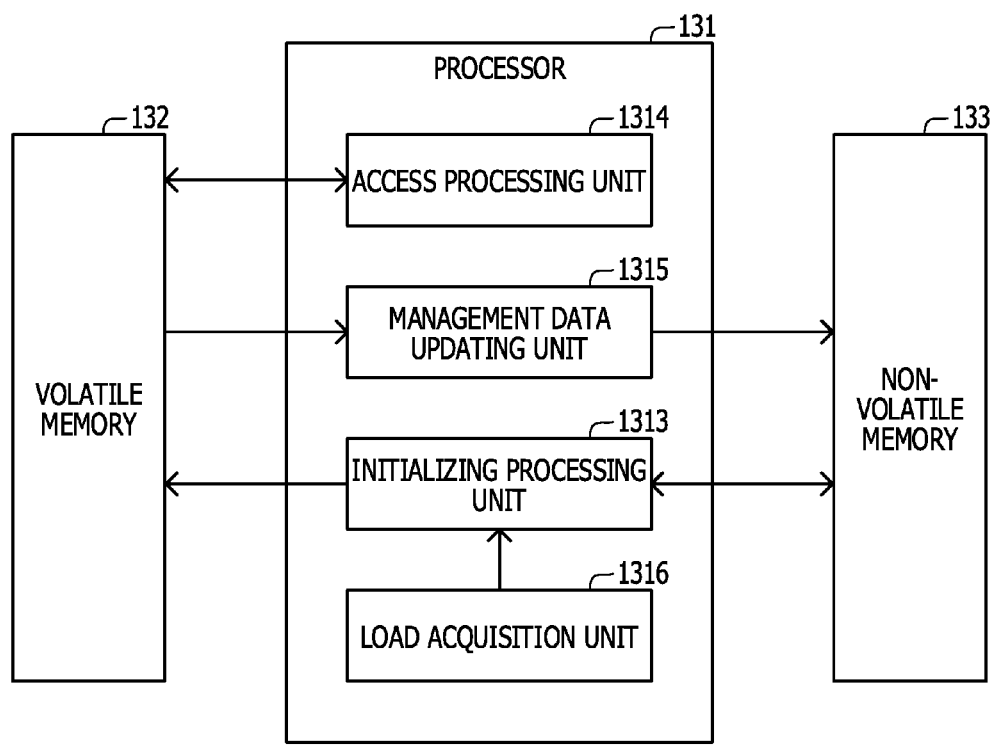
FIG. 4 illustrates an example of a function of a processor in FIG. 3.

Next, the function of the processor 131 will be described. FIG. 4 illustrates an example of the function of the processor in FIG. 3. In this example, the function of the processor 131 is implemented by the processor 131 executing a program stored in the non-volatile memory 133.

For example, as illustrated in FIG. 4, the function of the processor 131 includes an initializing processing unit 1313, an access processing unit 1314, a management data updating unit 1315, and a load acquisition unit 1316.

Figure 5:
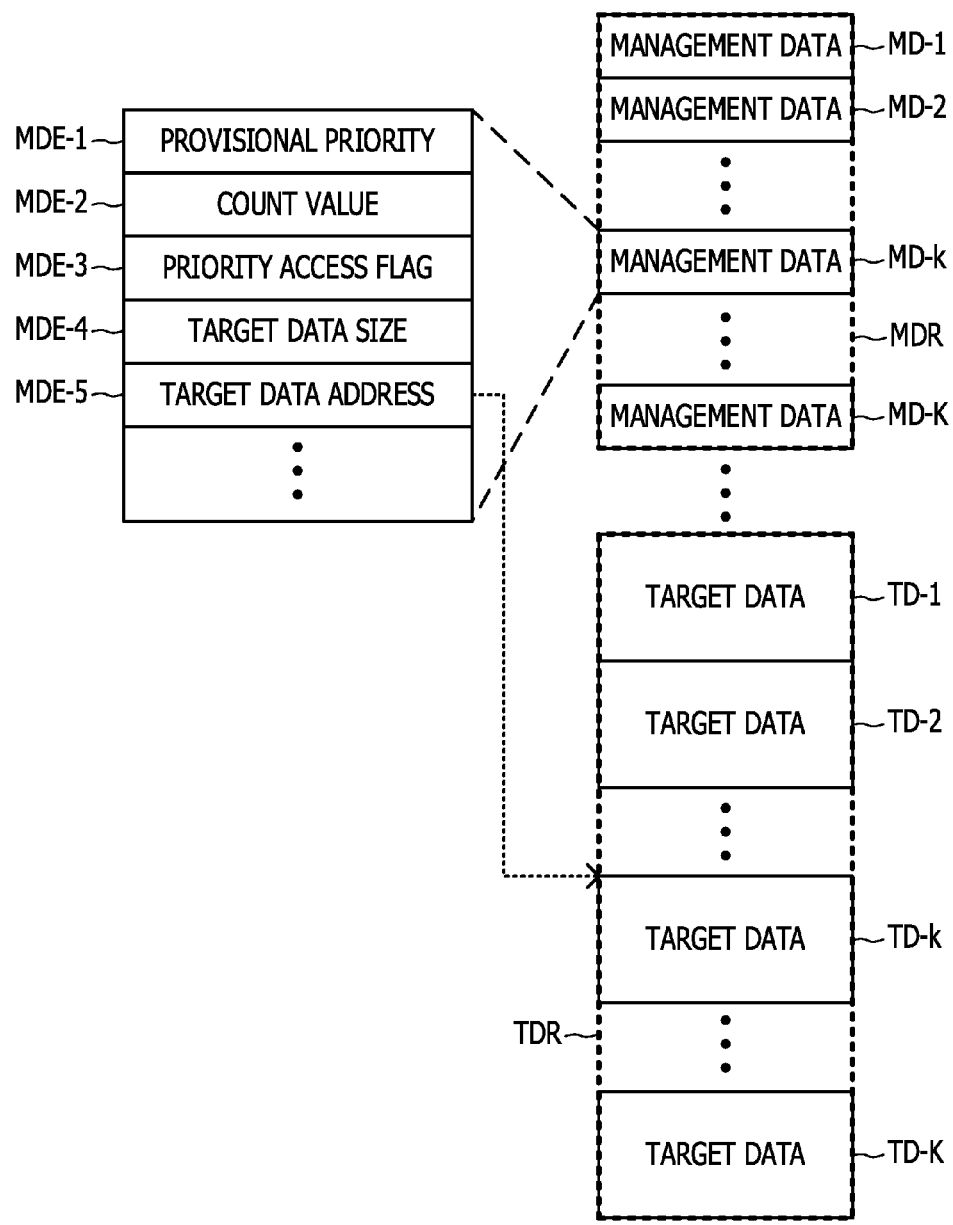
FIG. 5 illustrates an example of a target data group and a management data group, which are stored in a volatile memory in FIG. 3.

Here, the data group included in the program will be further described. FIG. 5 illustrates an example of a target data group and a management data group, which are stored in the volatile memory in FIG. 3. For example, as illustrated in FIG. 5, the data group included in the program includes the target data group and the management data group. The target data group includes K pieces of target data TD-1, TD-2, . . . , TD-K. K represents an integer of two or more. The management data group includes K pieces of management data MD-1, MD-2, . . . , MD-K. The management data MD-k is associated with the target data TD-k. k represents each integer of 1 to K.

In this example, since the program includes information (in other words, association information) associating the identifier for identifying the target data TD-k, and the region for storing the management data MD-k in the volatile memory 132, it associates the management data MD-k and the target data TD-k. In other words, the program includes information indicating the region group in which the management data group is stored, in the volatile memory 132.

For example, the association information is generated by using an enumerated type variable. The association information is an example of information associating the target data TD-k and the region for storing the management data MD-k. Furthermore, the association information is an example of information indicating the region group for storing the management data group.

In this example, the association information is set when the program is generated.

In this example, the management data MD-k includes the provisional priority MDE-1, the count value MDE-2, the priority access flag MDE-3, the target data size MDE-4, the target data address MDE-5, for the target data TD-k.

The provisional priority MDE-1 represents the provisional value of priority which is the access to the target data TD-k is preferred. In this example, the provisional priority MDE-1 is represented by an integer, and indicates that the access is preferred, as the value becomes smaller. In other words, as the value becomes smaller, the provisional priority MDE-1 is high. In this example, the provisional priority MDE-1 is set in advance.

The count value MDE-2 represents the count of times the target data TD-k is accessed. In this example, the count value MDE-2 is set to 0 in advance. As described later, in this example, the count value MDE-2 stored in the volatile memory 132 is updated by the access processing unit 1314.

The priority access flag MDE-3 represents whether the access to the target data TD-k is prioritized. In this example, in a case where the priority access flag MDE-3 is set to 0, this indicates that the access to the target data TD-k is not prioritized; and in a case where the priority access flag MDE-3 is set to 1, this indicates that the access to the target data TD-k is prioritized. In other words, in a case where the priority access flag MDE-3 is set to 0, the access to the target data TD-k is lowest. Further, in a case where the priority access flag MDE-3 is set to 1, the priority of the access to the target data TD-k is equal to the provisional priority MDE-1.

In this example, the priority access flag MDE-3 is set to 0 in advance. As described later, in the present embodiment, the priority access flag MDE-3 stored in the volatile memory 132 is updated by the initializing processing unit 1313.

The target data size MDE-4 is the size of the target data TD-k. In this example, the target data size MDE-4 is set in advance. The target data address MDE-5 is an address representative of a region for storing the target data TD-k in the volatile memory 132. The address represents the position in the volatile memory 132. In this example, the address is represented by an integer. The address representative of the region is, for example, the address in which the region is started (in other words, the head address of the region).

In this example, the target data address MDE-5 is set to the address representative of the region for storing the target data TD-k in advance, by a first initializing process, which will be described later, in the case where the target data TD-k is stored in the volatile memory 132. As described later, in this example, the target data address MDE-5 stored in the volatile memory 132 is updated by the initializing processing unit 1313.

In the case where the processor 131 is started and in the case where the processor 131 is restarted, the initializing processing unit 1313 reads the initializing process flag stored in non-volatile memory 133. The initializing process flag represents one initializing process of a first initializing process, a second initializing process, and a third initializing process.

The initializing processing unit 1313 executes the initializing process that the read initializing process flag represents.

The initializing processing unit 1313 stores K pieces of management data MD-1, . . . , the MD-K that are included in the program stored in the non-volatile memory 133, in K continuous management data regions of the volatile memory 132, in each initializing process. Incidentally, K management data regions may not be continuous.

The K management data region in which K pieces of management data MD-1, . . . , the MD-K are stored may be represented as a management data region group MDR. The K pieces of management data MD-1, . . . , MD-K are an example of the second data group. The management data region group MDR is an example of the second region group.

The initializing processing unit 1313 stores K pieces of target data TD-1, . . . , TD-K that are included in the program stored in the non-volatile memory 133, in K continuous target data regions of the volatile memory 132, in each initializing process. Incidentally, the K target data regions for storing K pieces of target data TD-1, . . . , TD-K may be represented as a target data region group TDR. The K pieces of target data TD-1, . . . , TD-K are an example of the first data group. The target data region group TDR is an example of the first region group.

In the first initializing process, a region in which the management data MD-k is stored is positioned closer to the top as k becomes smaller. Similarly, in the first initializing process, a region in which the target data TD-k is stored is positioned closer to the top as k becomes smaller. In addition, the region in which the management data MD-k is stored may be positioned differently from the case of being closer to the top as k becomes smaller.

In this example, a direction from the beginning to the end in the volatile memory 132 is a direction in which the address is increased. Incidentally, the direction from the beginning to the end in the volatile memory 132 may be a direction in which the address is decreased.

In the second initializing process, a region in which the management data MD-k is stored is positioned closer to the top as k becomes smaller, similar to the first initializing process. In addition, the region in which the management data MD-k is stored may be positioned differently from the case of being closer to the top as k becomes smaller.

Figure 7:
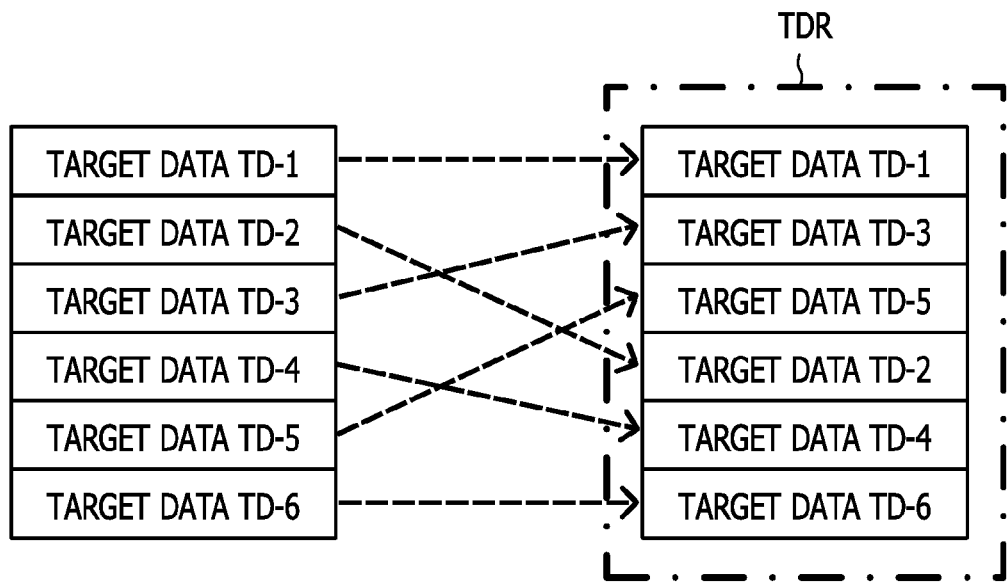
FIG. 7 illustrates an example of the target data group stored in the volatile memory in FIG. 3.

In the second initializing process, a region in which the target data TD-k is stored is positioned closer to the top as the count value MDE-2 for the target data TD-k increases. FIG. 6 is a table representing an example of the count value for each piece of target data. For example, the case where the count value MDE-2 for each piece of the target data TD-1 to TD-6 is stored in the non-volatile memory 133 as illustrated in FIG. 6 is assumed. FIG. 7 illustrates an example of a target data group stored in the volatile memory in FIG. 3. In this case, in the second initializing process, the region in which the target data pieces TD-1 to TD-6 are stored in the target data region group TDR of the volatile memory 132 is positioned as illustrated in FIG. 7.

For example, in the second initializing process, the initializing processing unit 1313 determines a region in which the target data TD-k is stored in the volatile memory 132, based on the count value MDE-2 for the target data TD-k, stored in the non-volatile memory 133. In this example, the region in which the target data TD-k is stored is included in the target data region group TDR.

Further, in the second initializing process, the initializing processing unit 1313 stores the target data TD-k, in the determined region, and stores region data indicating the determined region, in a region data region included in a region storing the management data MD-k. In this example, the region data is a target data size MDE-4 and a target data address MDE-5. The region data region is a region storing the target data size MDE-4 and the target data address MDE-5.

In the third initializing process, a region in which the management data MD-k is stored is positioned closer to the top as k becomes smaller, similar to the first initializing process. In addition, a case other than the case where a region in which the management data MD-k is stored is positioned closer to the top as k becomes smaller, is assumed.

In the third initializing process, a region for storing the target data TD-i for which the priority access flag MDE-3 is set to 1 is positioned closer to the top than a region for storing the target data TD-j for which the priority access flag MDE-3 is set to 0. i and j represent each integer of 1 to K. Further, i is different from j.

Furthermore, in the third initializing process, a region for storing the target data TD-k for which the priority access flag MDE-3 is set to 1 is positioned close to the top as the provisional priority MDE-1 becomes high. In addition, in the third initializing process, a region for storing each of a plurality of pieces of target data TD-k, for which the priority access flag MDE-3 is set to 1 and the provisional priority MDE-1 is identical to each other, is positioned close to the top as the count value MDE-2 becomes high.

Figure 9:
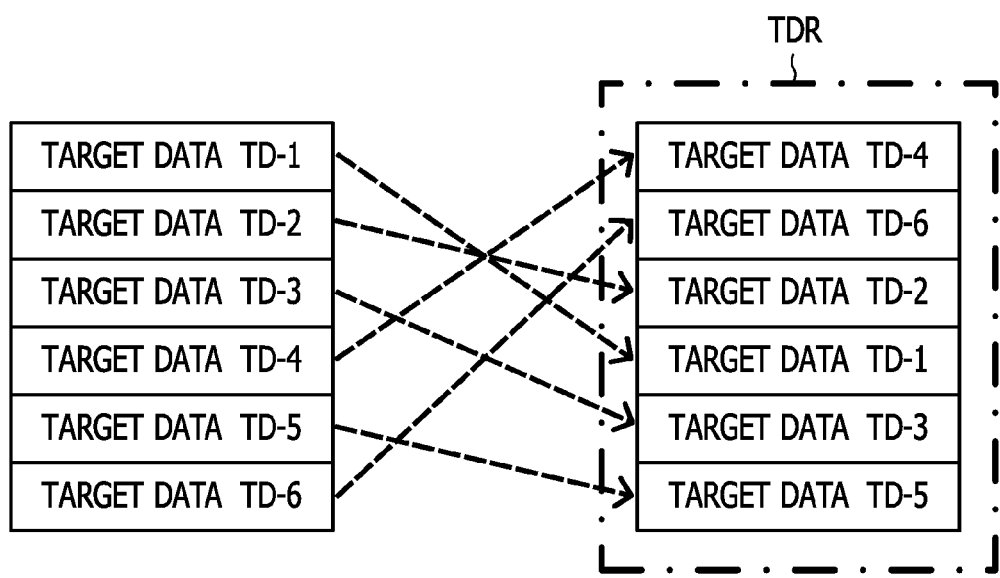
FIG. 9 illustrates an example of the target data group stored in the volatile memory in FIG. 3.

FIG. 8 is a table representing an example of the priority access flag, the provisional priority, and the count value for each piece of target data. For example, the case where the count value MDE-2, the priority access flag MDE-3, and the provisional priority MDE-1 for each of the target data pieces TD-1 to TD-6 are stored in the non-volatile memory 133, as illustrated in FIG. 8 is assumed. FIG. 9 illustrates an example of the target data group that is stored in the volatile memory in FIG. 3. In this case, in the third initializing process, the region in which the target data pieces TD-1 to TD-6 are stored in the target data region group TDR of the volatile memory 132 is positioned as illustrated in FIG. 9.

For example, in the third initializing process, the initializing processing unit 1313 determines a region in which the target data TD-k is to be stored in the volatile memory 132, based on the provisional priority MDE-1, the count value MDE-2, and the priority access flag MDE-3, which are stored in the non-volatile memory 133. In this example, the region in which the target data TD-k is to be stored is included in the target data region group TDR.

In addition, in the third initializing process, the initializing processing unit 1313 stores the target data TD-k in the determined region, similar to the second initializing process, and stores the region data representing the determined region, in the region data region included in the region for storing the management data MD-k.

In the case where a request for access to the target data TD-k is generated, the access processing unit 1314 reads the region data included in the management data MD-k, from the region for storing the management data MD-k associated with the target data TD-k.

The access processing unit 1314 adds 1 to the count value MDE-2 included in the management data MD-k that is associated with the target data TD-k.

In a case where the access request is a read request, the access processing unit 1314 reads the target data TD-k, from the region that the read region data indicates (in other words, the target data region). In a case where the access request is a write request, the access processing unit 1314 writes the target data TD-k, to the target data region that the read region data indicates. In this example, the access to the target data TD-k stored in the volatile memory 132 is performed using the data cache memory 1312, as described above.

Figure 10:
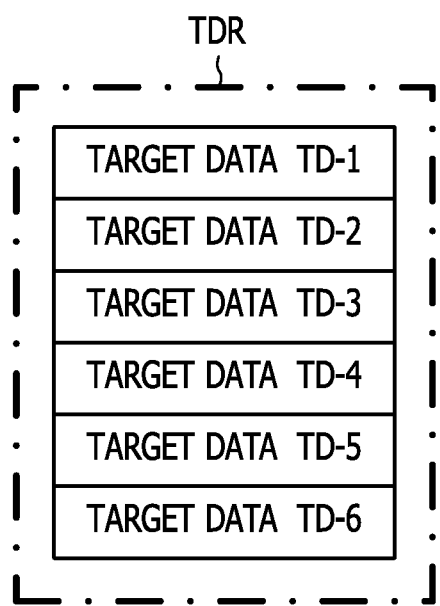
FIG. 10 illustrates an example of the target data group stored in the volatile memory in FIG. 3.
Figure 11:
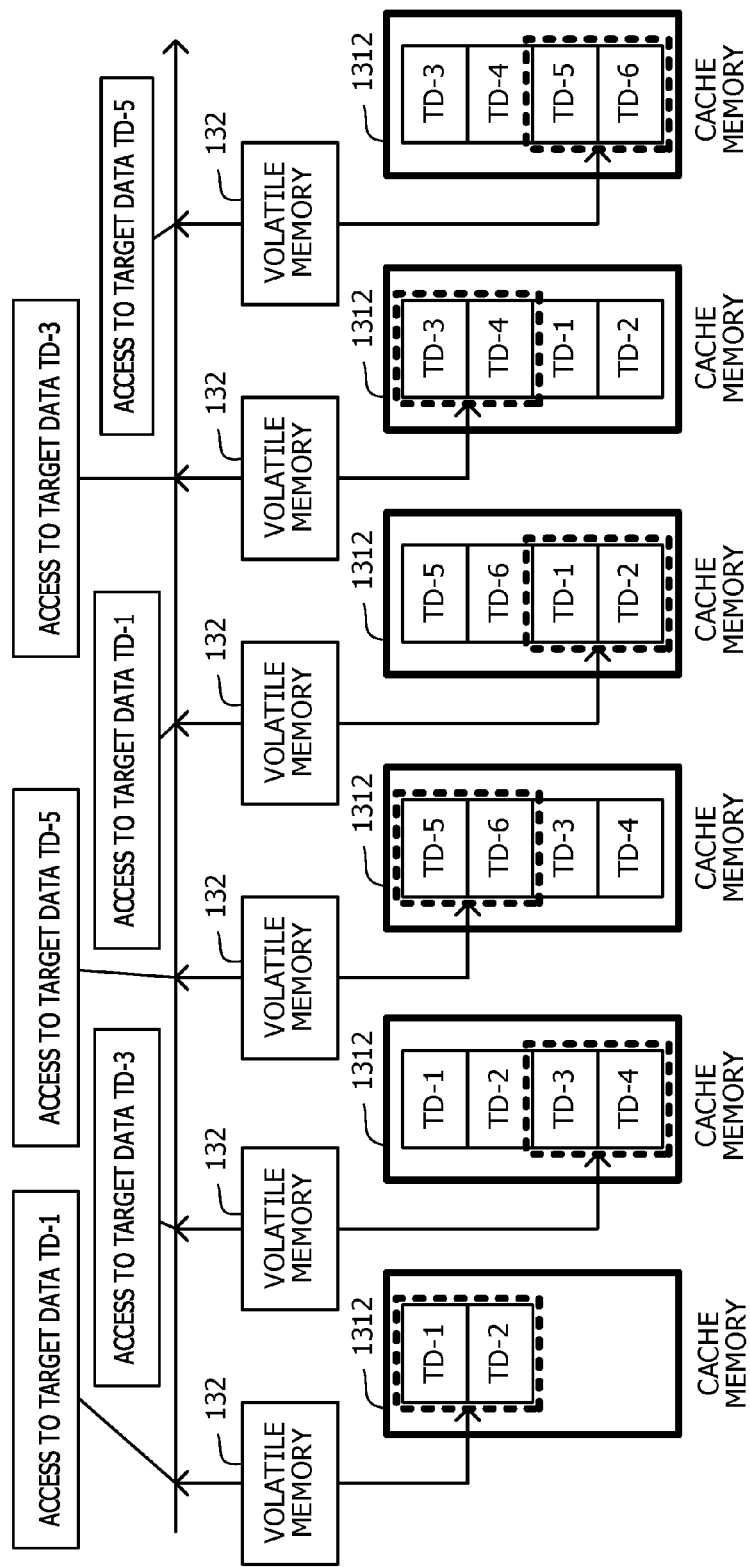
FIG. 11 illustrates an example of an access operation to the target data by the processor.

FIG. 10 illustrates an example of the target data group that is stored in the volatile memory in FIG. 3. For example, in the first initializing process, the region in which the target data pieces TD-1 to TD-6 are stored in the target data region group TDR of the volatile memory 132 is positioned as illustrated in FIG. 10. FIG. 11 illustrates an example of an access operation to the target data by the processor. For example, as illustrated in FIG. 11, the case where access requests for the target data pieces TD-1, TD-3, TD-5, TD-1, TD-3, and TD-5 are generated in this order is assumed.

In this case, at the time the access request for the target data TD-1 is generated, the processor 131 accesses the target data TD-1 stored in the volatile memory 132.

Further, the processor 131 stores the target data pieces TD-1 and TD-2, stored in the volatile memory 132, in the data cache memory 1312.

Next, at the time the access request for the target data TD-3 is generated, the processor 131 accesses the target data TD-3 stored in the volatile memory 132. Further, the processor 131 stores the target data pieces TD-3 and TD-4, stored in the volatile memory 132, in the data cache memory 1312.

Next, at the time the access request for the target data TD-5 is generated, the processor 131 accesses the target data TD-5 stored in the volatile memory 132. Further, the processor 131 erases the target data TD-1 and TD-2 from the data cache memory 1312, and stores the target data pieces TD-5 and TD-6, which were stored in the volatile memory 132, in the data cache memory 1312. Thereafter, each time the access request is generated, the processor 131 accesses the target data TD-k stored in the volatile memory 132.

Figure 12:
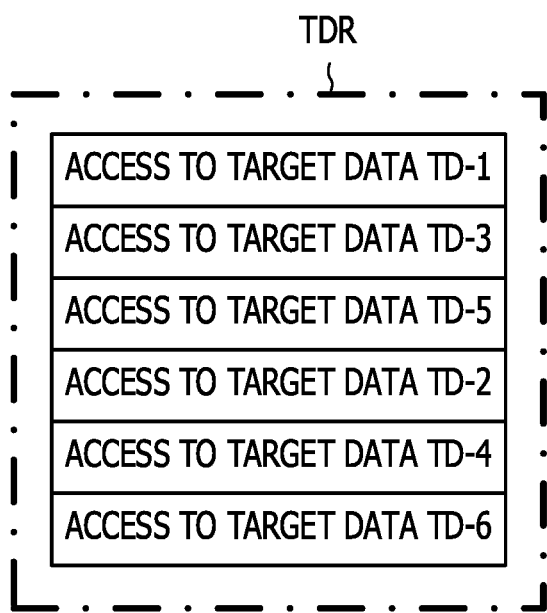
FIG. 12 illustrates an example of a target data group stored in the volatile memory in FIG. 3.
Figure 13:
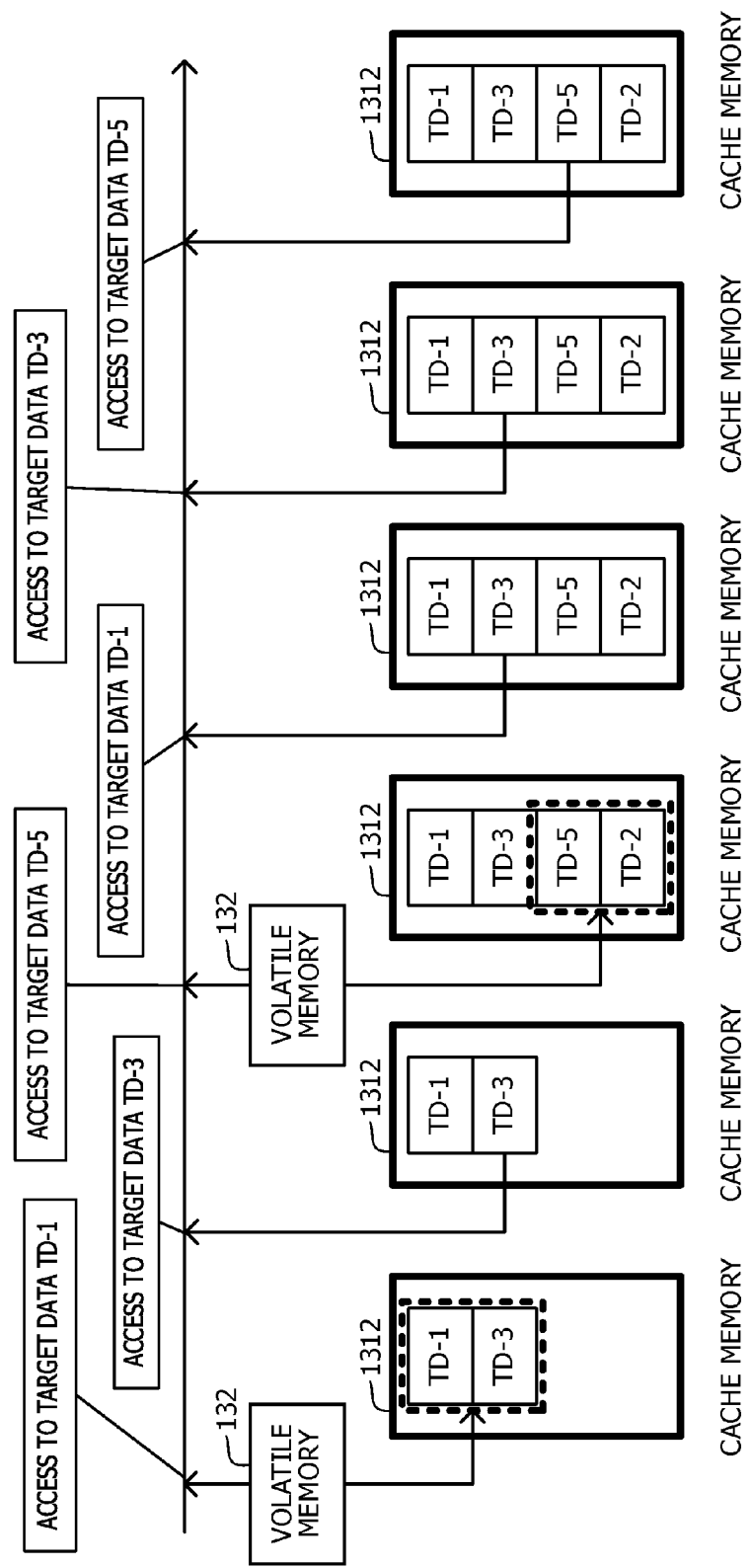
FIG. 13 illustrates an example of an access operation to the target data by the processor.

Meanwhile, in the second initializing process, for example, the region in which the target data pieces TD-1 to TD-6 are stored in the target data region group TDR of the volatile memory 132 is positioned, based on the count value MDE-2, as illustrated in FIG. 12. FIG. 12 illustrates an example of a target data group stored in the volatile memory in FIG. 3. FIG. 13 illustrates an example of an access operation to the target data by the processor. For example, as illustrated in FIG. 13, the case where access requests for the target data pieces TD-1, TD-3, TD-5, TD-1, TD-3, and TD-5 are generated in this order is assumed.

In this case, at the time the access request for the target data TD-1 is generated, the processor 131 accesses the target data TD-1 stored in the volatile memory 132. Further, the processor 131 stores the target data pieces TD-1 and TD-3, stored in the volatile memory 132, in the data cache memory 1312.

Next, at the time the access request for the target data TD-3 is generated, the processor 131 accesses the target data TD-3 stored in the data cache memory 1312.

Next, at the time the access request for the target data TD-5 is generated, the processor 131 accesses the target data TD-5 stored in the volatile memory 132. Further, the processor 131 stores the target data pieces TD-5 and TD-2, stored in the volatile memory 132, in data cache memory 1312.

Next, at the time the access requests for the target data pieces TD-1, TD-3 and TD-5 are respectively generated, the processor 131 accesses the target data pieces TD-1, TD-3, and TD-5, stored in the data cache memory 1312, respectively. Therefore, in this case, the count of times the processor 131 accesses the target data TD-k which is stored in the volatile memory 132 is reduced.

Every time a predetermined period has elapsed, the management data updating unit 1315 writes the count value MDE-2 which is stored in the volatile memory 132, and the initializing process flag that represents the second initializing process, to the non-volatile memory 133. In addition, the management data updating unit 1315 restarts the processor 131. The restart of the processor 131 may be represented as the reset of the processor 131. For example, the restart of the processor 131 is implemented by generating a predetermined reset signal.

Further, the management data updating unit 1315 determines whether or not the load of the communication with the mobile station device 20, acquired by the load acquisition unit 1316 to be described later, satisfies a predetermined condition, at a predetermined timing. If the load satisfies the above condition, the management data updating unit 1315 determines the priority access flag for the target data TD-k. In addition, the management data updating unit 1315 writes the priority access flag that is determined, and the initializing process flag that represents the third initializing process, to the non-volatile memory 133. In addition, the management data updating unit 1315 restarts the processor 131.

Every time a predetermined period (for example, 1 hour) has elapsed, the load acquisition unit 1316 acquires the load of communication between the base station device 10 and the mobile station device 20. In this example, the load is the count of PS calls per unit time, the count of CS calls per unit time, the count of HO calls per unit time, and a communication traffic volume per unit time. PS, CS, and, HO are abbreviations of Packet Switching, Circuit Switching, and Handover, respectively. The description of the functions of the processor 131 is supplemented by the following description of the operation.

(Operation)

An example of the operation of the processor 131 will be described. FIGS. 14, 15, 16, 17 and 18 are flowcharts each illustrating an example of a process that the processor in FIG. 3 executes. In a case were the processor 131 is started, and a case where the processor 131 is restarted, the processor 131 executes the process represented by the flowchart of FIG. 14.

Figure 14:
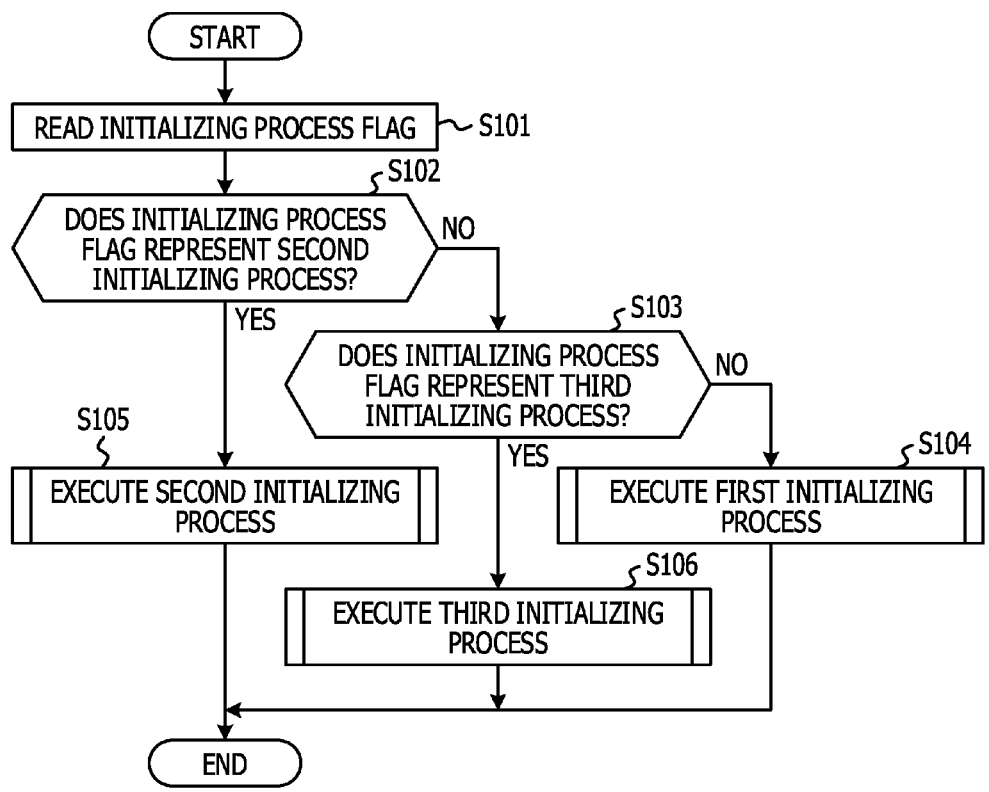
FIGS. 14, 15, 16, 17 and 18 are flowcharts each illustrating an example of a process that the processor in FIG. 3 executes.

First, the processor 131 reads the initializing process flag stored in the non-volatile memory 133 (step S101 in FIG. 14). Next, the processor 131 determines whether or not the read initializing process flag represents the second initializing process (step S102 in FIG. 14). In this example, the case where the initializing process flag is the first initializing process is assumed.

In this case, the processor 131 determines the result as "No", and determines whether or not the read initializing process flag represents the third initializing process (step S103 on FIG. 14). Then, the processor 131 determines the result as "No", and executes the first initializing process (step S104 in FIG. 14). Then, the processor 131 ends the process of FIG. 14.

Figure 15:
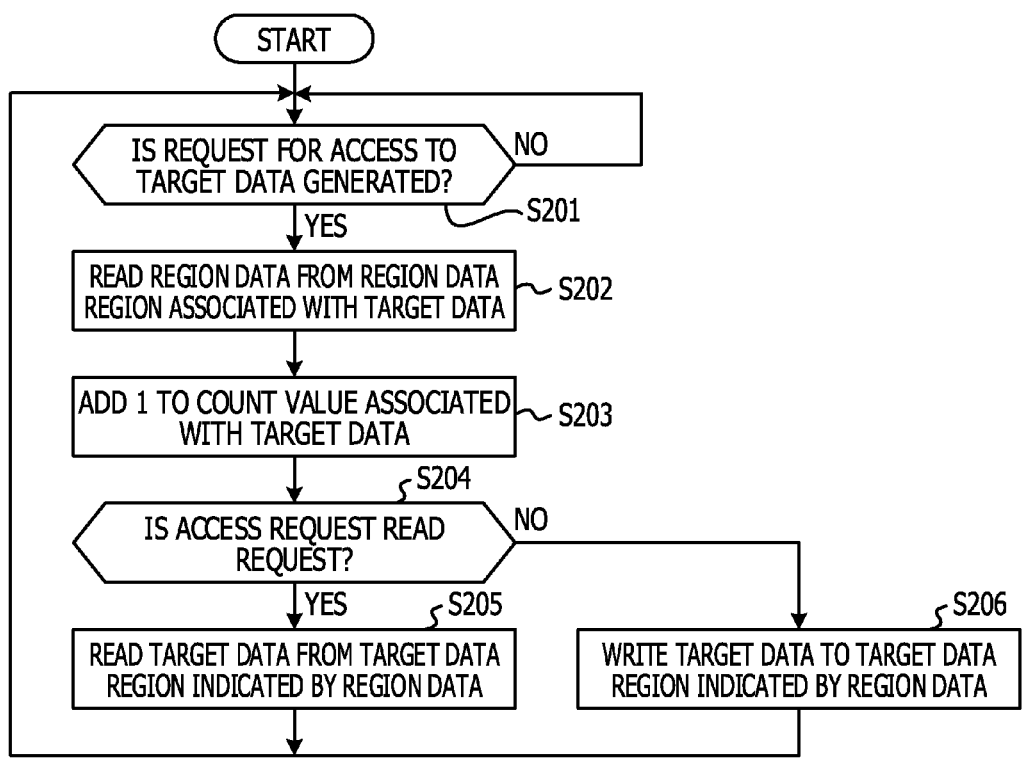

Further, the processor 131 executes the process represented by the flowchart in FIG. 15. The flowchart illustrated in FIG. 15 corresponds to the step S104 in FIG. 14. The processor 131 waits until a request for access to the target data TD-k is generated ("No" route of step S201 in FIG. 15). In this example, a case where a request for access to the target data TD-k is generated is assumed. In this example, the request for access to the target data TD-k includes an identifier for identifying the target data TD-k.

In this case, the processor 131 determines the result as "Yes", and determines a region for storing the management data MD-k in the volatile memory 132, based on the identifier included in the access request and the association information. Then, the processor 131 reads the region data included in the management data MD-k, from the determined region (step S202 in FIG. 15).

Next, the processor 131 stores the determined region, and adds 1 to the count value MDE-2 included in the management data MD-k which is associated with the target data TD-k (step S203 in FIG. 15).

Next, the processor 131 determines whether or not the access request is a read request (step S204 in FIG. 15). In a case where the access request is a read request, the processor 131 determines the result as "Yes", and reads the target data TD-k from the region indicated by the read region data (in other words, a target data region) (step S205 in FIG. 15). Meanwhile, in a case where the access request is a write request, the processor 131 determines the result as "No", and writes the target data TD-k to the target data region indicated by the read region data (step S206 in FIG. 15). In this example, the access to the target data TD-k stored in the volatile memory 132 is performed using the data cache memory 1312, as described above.

Then, the processor 131 returns to step S201, and repeatedly executes the process from step S201 to step S206.

Figure 16:
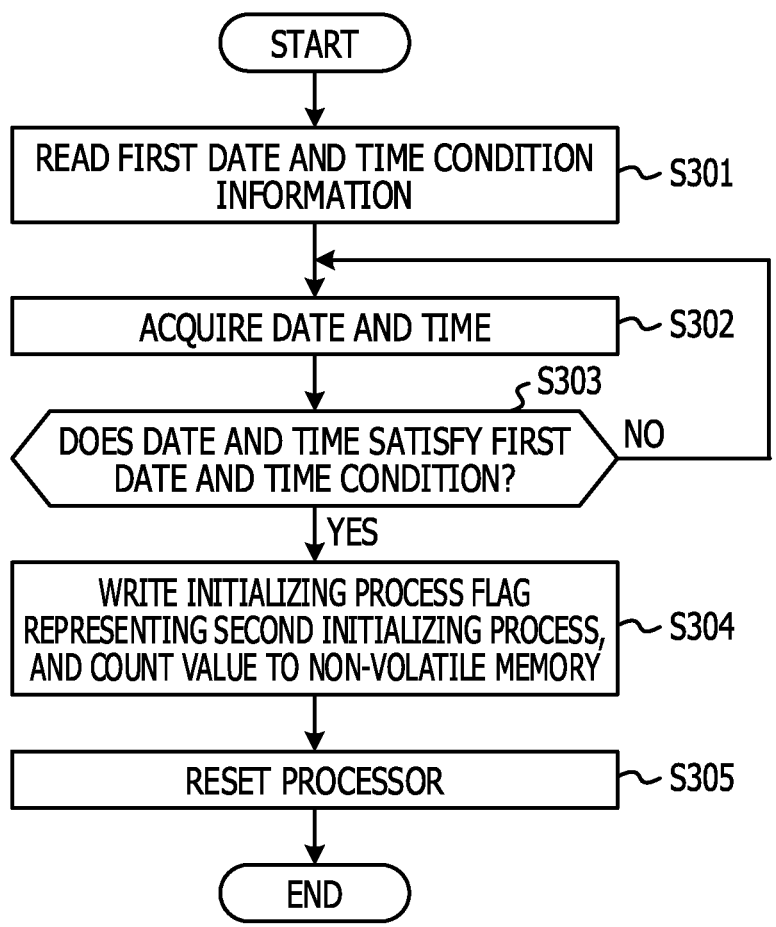

Further, the processor 131 executes the process represented by the flowchart in FIG. 16. The flowchart illustrated in FIG. 16 corresponds to the step S105 in FIG. 14. The processor 131 reads the first date and time condition information stored in the volatile memory 132 (step S301 in FIG. 16). The first date and time condition information represents the first date and time condition. The first date and time condition is a condition in which the current date and time is the date and time when the second initializing process is executed.

For example, the first date and time condition includes a period at which the second initializing process is executed, and a time at which the second initializing process is executed. In a case where the period at which the second initializing process is executed is one year, the first date and time condition includes the month and date at which the second initializing process is executed. In a case where the period at which the second initializing process is executed is one month, the first date and time condition includes the date at which the second initializing process is executed.

Next, the processor 131 acquires the current date and time (step S302 in FIG. 16). Then, the processor 131 determines whether or not the acquired date and time satisfies the first date and time condition that the read first date and time condition information represents (step S303 in FIG. 16).

In a case where the acquired date and time do not satisfy the first date and time condition, the processor 131 determines the result as "No", returns to step S302, and repeatedly executes the process from step S302 to step S303.

In a case where the acquired date and time satisfy the first date and time condition, the processor 131 determines the result as "Yes", and the process proceeds to step S304. Then, the processor 131 writes the initializing process flag representing the second initializing process, and the count value MDE-2 for each piece of target data TD-k which is stored in the volatile memory 132, to the non-volatile memory 133 (step S304 in FIG. 16).

In this example, the time when the count value MDE-2 stored in the volatile memory 132 is written to the non-volatile memory 133 is consistent with the time when the second initializing process is executed. Incidentally, the time when the count value MDE-2 stored in the volatile memory 132 is written to the non-volatile memory 133 may be a time different from the time when the second initializing process is executed.

Further, the frequency at which the count value MDE-2 stored in the volatile memory 132 is written to the non-volatile memory 133 may be different from the frequency at which the second initializing process is executed. For example, the period at which the count value MDE-2 stored in the volatile memory 132 is written to the non-volatile memory 133 may be different from the period at which the second initializing process is executed.

Then, the processor 131 resets the processor 131 (in other words, restart) (step S305 in FIG. 16). Thus, the processor 131 ends the process of FIG. 16.

In a case where it is restarted, the processor 131 executes the process of FIG. 14 again. In this case, since the initializing process flag that is stored in the non-volatile memory 133 represents the second initializing process, the processor 131 determines the result as "Yes" in step S102 of FIG. 14, and executes the second initializing process (step S105 in FIG. 14). Thus, the processor 131 ends the process of FIG. 14.

Figure 17:
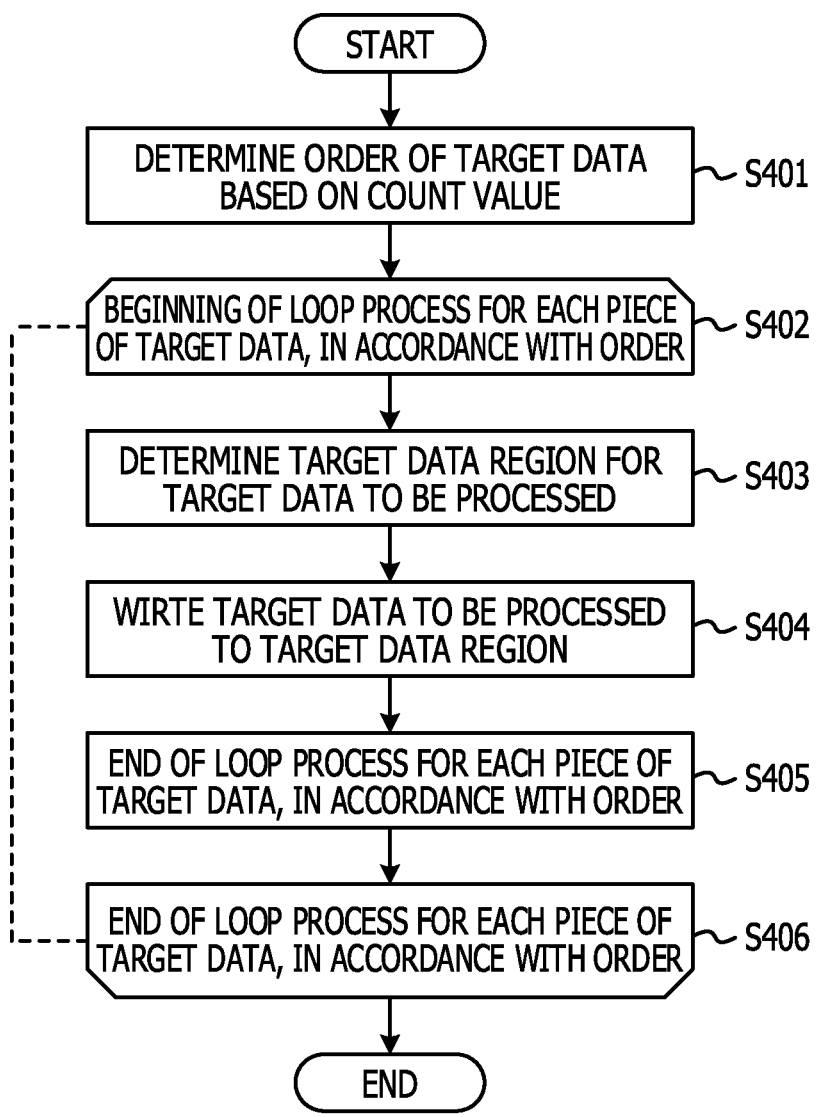

In this example, the processor 131 executes the process represented by the flowchart in FIG. 17, as a process to store the target data TD-k in the volatile memory 132, in the second initializing process (the step S105 in FIG. 14).

The processor 131 determines the order of K pieces of target data TD-1, . . . , TD-K, based on the count value MDE-2 stored in the non-volatile memory 133 (step S401 in FIG. 17). In this example, in the determined order, the target data TD-k is positioned closer to the top, as the count value MDE-2 for the target data TD-k increases.

The processor 131 executes the loop process for each piece of target data TD-1, . . . , TD-K, in accordance with the determined order. The beginning of the loop process is step S402, the end of the loop process is step S406. In this example, the target data TD-k which is the target of the loop process is represented as the target data TD-k to be processed.

The loop process will be further described. The processor 131 determines the target data region, which is a region in which the target data TD-k to be processed is stored, in the volatile memory 132 (step S403 in FIG. 17). The target data region to be determined is a region starting from the address the beginning of the target data region group TDR, at the time of the first execution of the loop process, and having the same size as that of the target data TD-k to be processed. The target data region to be determined is a region starting from an address following the target data region that is determined by the loop process which is executed immediately before, at the time of the second and subsequent execution of the loop process, and having the same size as that of the target data TD-k to be processed.

Next, the processor 131 writes the target data TD-k to be processed, to the determined target data region (step S404 in FIG. 17). The processor 131 writes region data representing the determined target data region, to the region data region included in the region in which the management data MD-k associated with the target data TD-k to be processed is stored, in the volatile memory 132. Thus, the processor 131 updates the region data associated with the target data TD-k to be processed (step S405 in FIG. 17). Thus, the processor 131 executes the loop process.

Then, the processor 131 ends the process of FIG. 17, after executing the loop process for each piece of the target data TD-1, . . . , TD-K, in accordance with the determined order. Thus, the region in which the target data TD-k is stored, in the volatile memory 132, is positioned closer to the top, as the count value MDE-2 for the target data TD-k increases.

Figure 18:
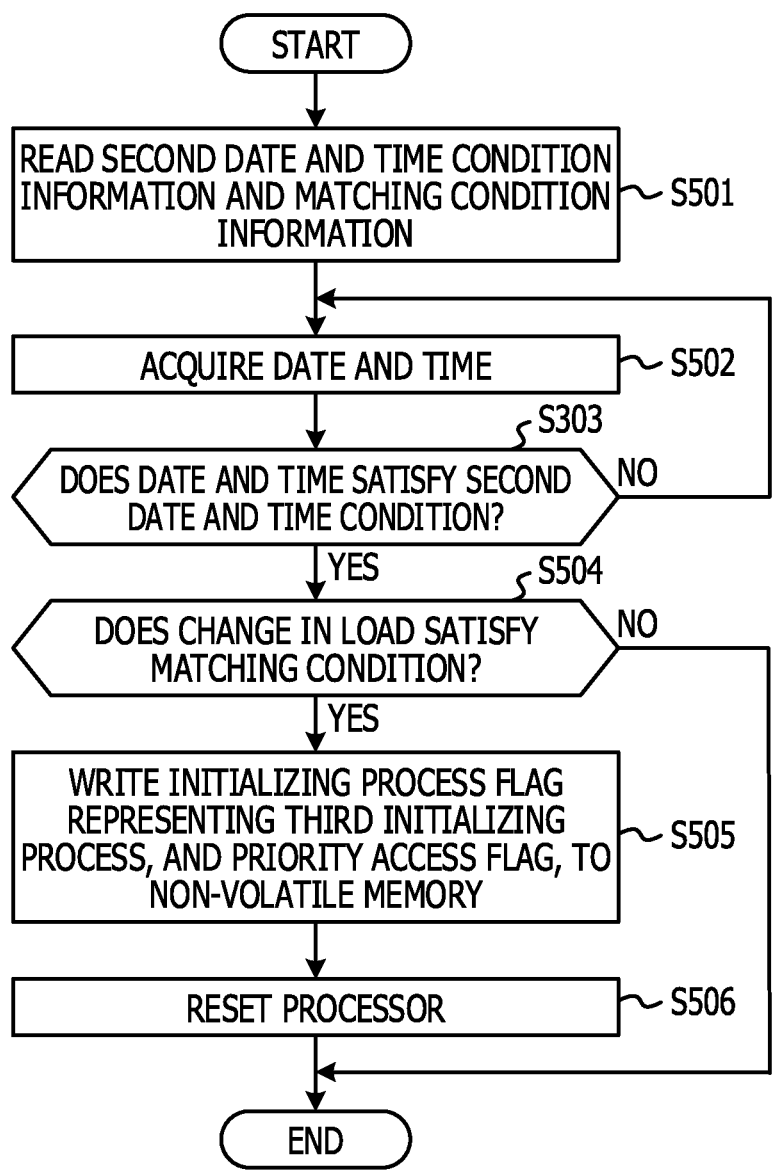

Further, the processor 131 executes the process represented by the flowchart in FIG. 18. The flowchart illustrated in FIG. 18 corresponds to the step S106 in FIG. 14. The processor 131 reads second date and time condition information and matching condition information which are stored in the volatile memory 132 (step S501 in FIG. 18). The second date and time condition information represents second date and time condition. The second date and time condition is a condition in which the current date and time is the date and time when the match determination is executed. The match determination is determination as to whether the change over time in the communication load between the base station device 10 and the mobile station device 20 satisfies the match condition represented by the matching condition information. The match condition will be described later.

Next, the processor 131 acquires the current date and time (step S502 in FIG. 18). Then, the processor 131 determines whether or not the acquired date and time satisfies the second date and time condition represented by the read second date and time condition information (step S503 in FIG. 18).

In a case where the acquired date and time do not satisfy the second date and time condition, the processor 131 determines the result as "No", returns to step S502, and repeatedly executes the process from step S502 to step S503. In a case where the acquired date and time satisfy the second date and time condition, the processor 131 determines the result as "Yes", and executes the match determination (step S504 in FIG. 18).

Figure 19:
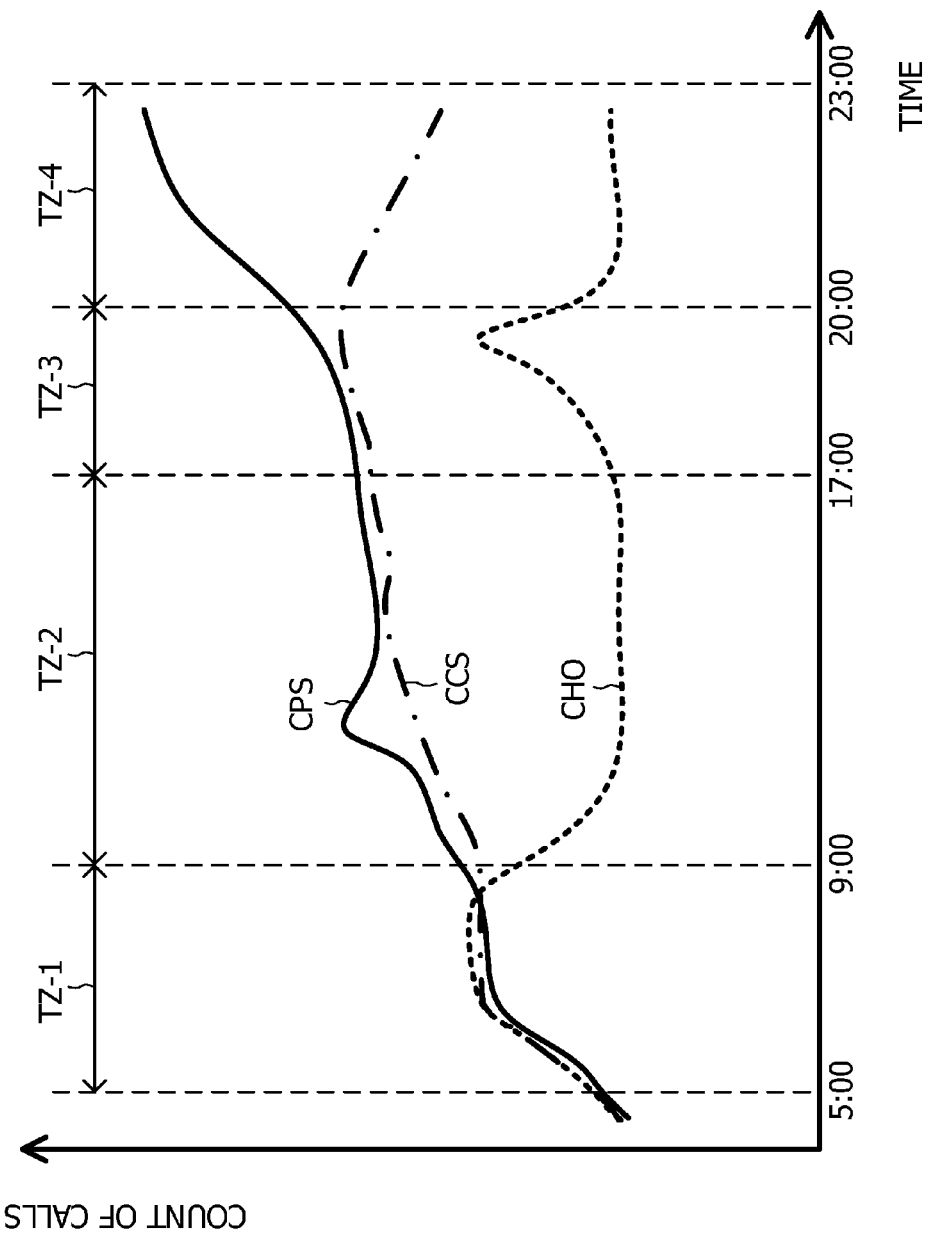
FIG. 19 is a graph representing an example of a change in a count of CS calls, a count of PS calls, and a count of HO calls, in a day.

Here, the match condition will be further described. FIG. 19 is a graph representing an example of a change in the count of CS calls, the count of PS calls, and the count of HO calls, in a day. For example, the count of CS calls CCS, the count of PS calls CPS, and the count of HS calls CHO may change in a day, as illustrated in FIG. 19. In this example, as described above, every time a predetermined period (for example, 1 hour) has elapsed, the processor 131 acquires the count of PS calls per unit time, the count of CS calls per unit time, and the count of HO calls per unit time, respectively.

The match condition is a condition that the number of calls which are acquired at each of the plurality of times is within a predetermined range centered on the reference value of the number of calls, which is determined for the time, with respect to each of the count of PS calls, the count of CS calls, and the count of HO calls. The matching condition information includes information indicating a predetermined range (in other words, range information of the number of each call) centered on the reference value of the number of calls at each of the plurality of times, with respect to each of the count of PS calls, the count of CS calls, and the count of HO calls.

In this example, the range information of the number of each call which has the number of calls and time as dimensions, and is represented by a two dimensional array in which the value of the element within the above range is 1 and the value of the element out of the above range is 0.

Figure 20:
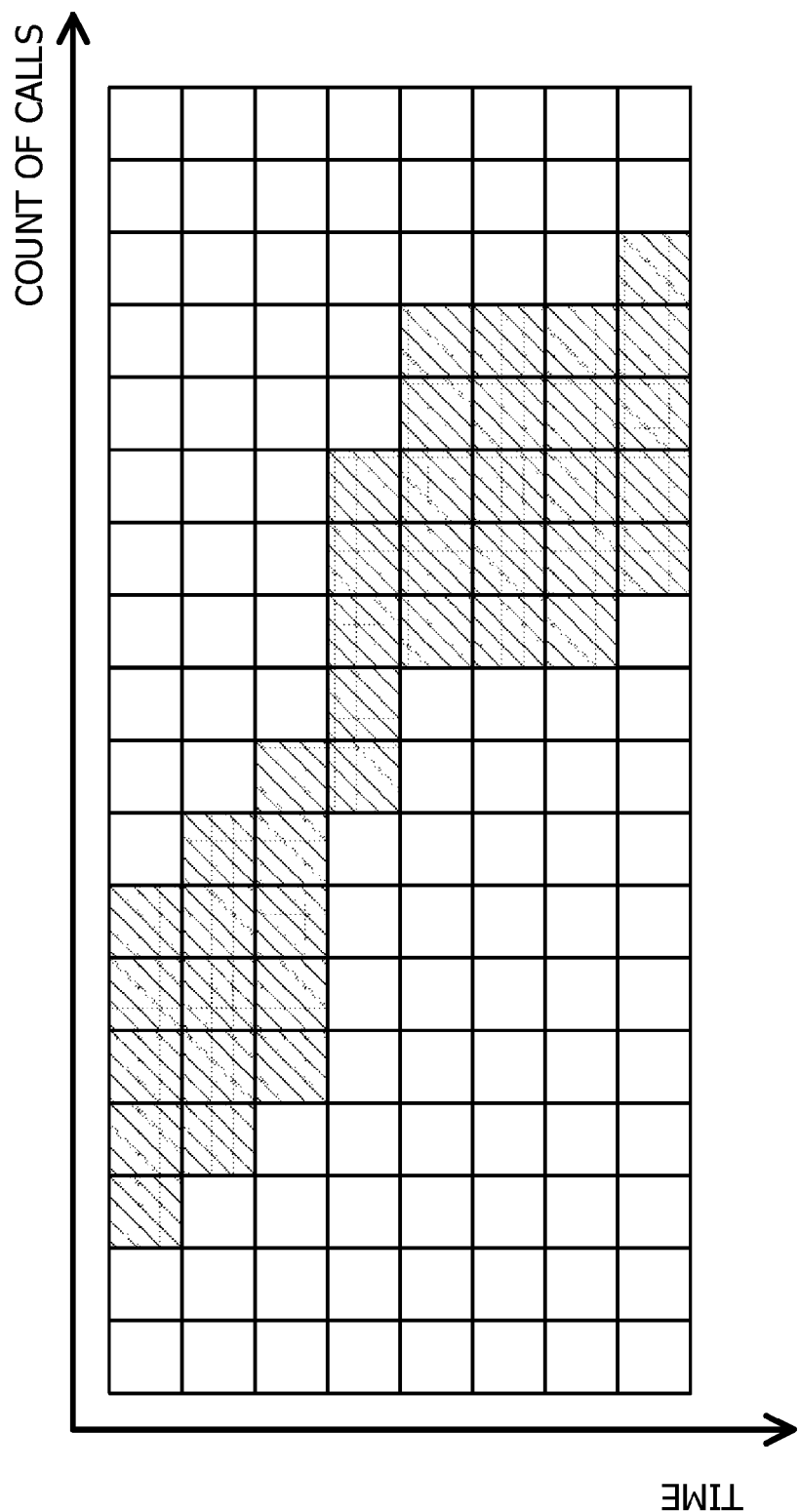
FIG. 20 illustrates an example of a two-dimensional array representing range information of the number of calls.

FIG. 20 illustrates an example of a two-dimensional array representing the range information of the number of calls. For example, in the case of using the number of calls and the time as the coordinate axes in a two-dimensional orthogonal coordinate system, the two-dimensional array is represented by FIG. 20. In FIG. 20, squares which are hatched by oblique lines represent that elements are within the above range, and the squares that are not hatched represent that elements are out of the above range.

The processor 131 of the present example generates a two-dimensional array which has the number of calls and the time as the coordinate axes, with respect to each of the count of PS calls, the count of CS calls, and the count of HO calls, and in which the value of the element corresponding to the acquired number of calls is 1 and the value of the element which does not correspond to the acquired number of calls is 0. In other words, the generated two-dimensional array represents the number of acquired calls.

Figure 21:
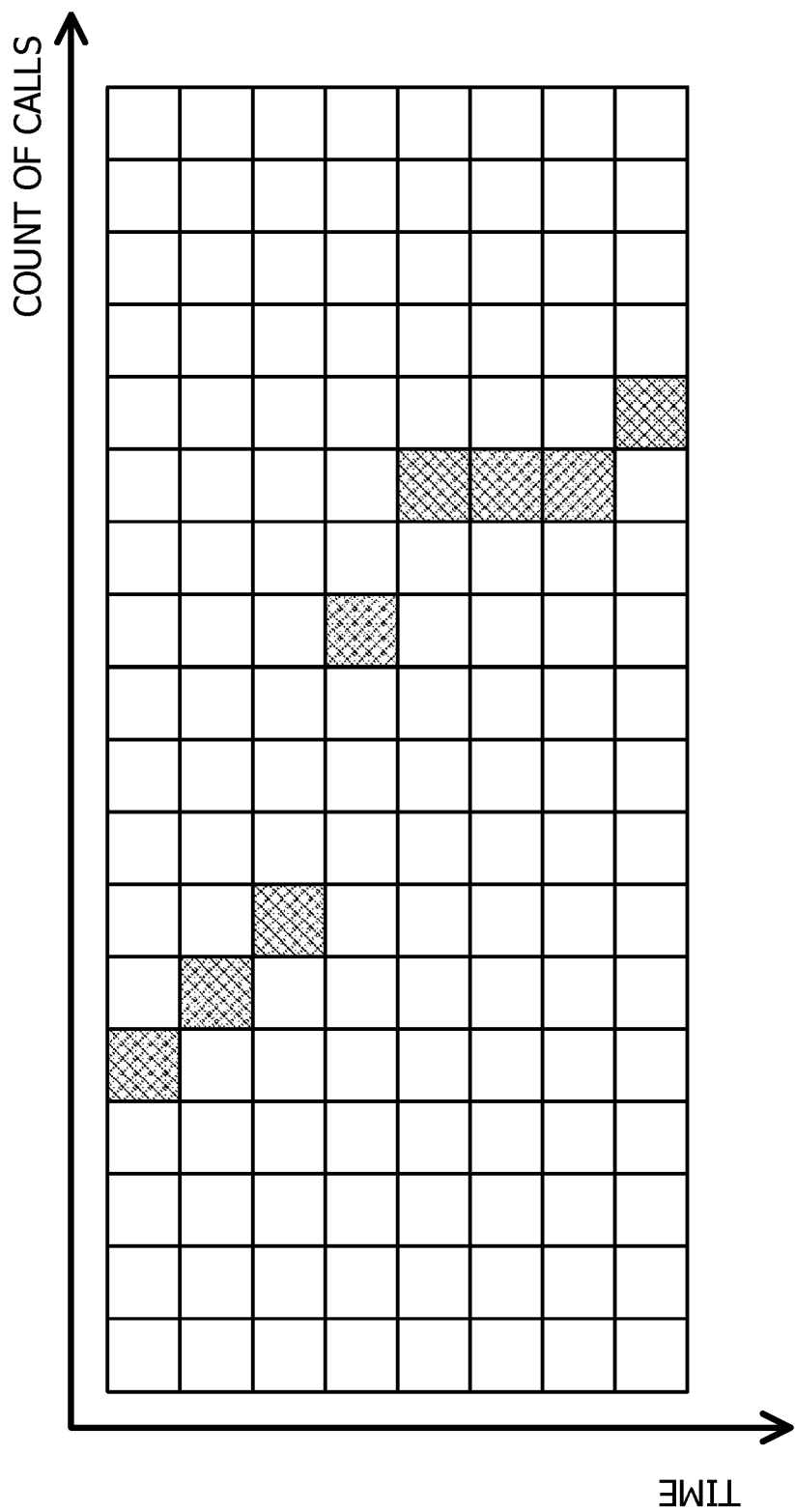
FIG. 21 illustrates an example of a two-dimensional array representing the number of calls that the processor in FIG. 3 acquires.

FIG. 21 illustrates an example of a two-dimensional array representing the number of calls that the processor in FIG. 3 acquires. For example, in the case of using the number of calls and the time as the coordinate axes in a two-dimensional orthogonal coordinate system, the generated two-dimensional array is represented by FIG. 21. In FIG. 21, squares which are cross-hatched represent that elements are the number of acquired calls, and the squares that are not hatched represent that elements are not the number of acquired calls.

Figure 22:
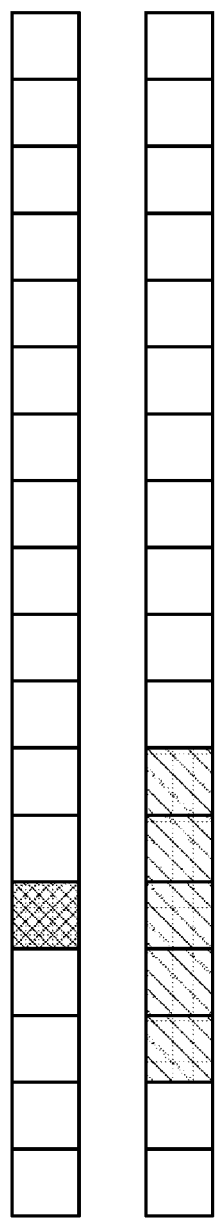
FIGS. 22A and 22B illustrate an example of a one-dimensional array that the processor in FIG. 3 acquires in the match determination.

FIGS. 22A and 22B illustrate an example of a one-dimensional array that the processor in FIG. 3 acquires in the match determination. In this example, processor 131 sequentially acquires a one-dimensional array corresponding to the same time, with respect to each of the count of PS calls, the count of CS calls, and the count of HO calls, from a two-dimensional array representing the range information and a two-dimensional array representing the number of acquired calls, for example, as illustrated in FIGS. 22A and 22B. FIG. 22A is a one-dimensional array acquired from the two-dimensional array representing the number of acquired calls, and FIG. 22B is a one-dimensional array acquired from the two-dimensional array representing the range information.

The processor 131 determines whether or not the value of the element included in the one-dimensional array representing the number of calls acquired is 1, and the value of the element included in the one-dimensional array representing the range information is 1. In a case where the value of element is 1, with respect to each of the count of PS calls, the count of CS calls, and the count of HO calls, and a one-dimensional array corresponding to each time, the processor 131 determines that the change over time in the communication load between the base station device 10 and the mobile station device 20 satisfies the match condition.

In a case where the change over time in the communication load between the base station device 10 and the mobile station device 20 satisfies the match condition, the processor 131 determines the result as "Yes" in step S504 of FIG. 18, and the process proceeds to step S505.

Then, the processor 131 writes the initializing process flag representing the third initializing process, and the priority access flag MDE-3 which is predetermined for each piece of target data TD-k, to the non-volatile memory 133 (step S505 in FIG. 18). In this example, the priority access flag MDE-3 for each piece of target data TD-k is included in the matching condition information. In other words, the priority access flag MDE-3 for each piece of target data TD-k is defined in association with the match condition.

Then, the processor 131 resets (in other words, restart) the processor 131 (step S506 in FIG. 18). Thus, the processor 131 ends the process of FIG. 18. Incidentally, in a case where the change over time in the communication load between the base station device 10 and the mobile station device 20 does not satisfy the match condition, the processor 131 determines the result as "No" in step S504 of FIG. 18. Thus, the processor 131 ends the process of FIG. 18, without executing the process of step S505 and step S506.

In this example, the processor 131 holds six sets of matching condition information and second date and time condition information. The processor 131 executes the process of FIG. 18, for each of the six sets.

FIG. 23 is a table representing an example of feature of a change in the count of CS calls, the count of PS calls, and the count of HO calls of FIG. 19. For example, a change in each of time zones TZ-1 to TZ-4 of a day, of the count of CS calls CCS, the count of PS calls CPS, and the count of HO calls CHO, illustrated in FIG. 19, has features as illustrated in FIG. 23. The time zones TZ-1 to TZ-4 are respectively a time zone of 5:00 to 9:00, a time zone of 9:00 to 17:00, a time zone of 17:00 to 20:00, and a time zone of 20:00 to 23:00. In this example, first to fourth sets are used respectively in order to cope with the change in the time zones TZ-1 to TZ-4 of the CS call, the PS call and the HO call.

With respect to the first set of second date and time condition information, the time at which the time zone TZ-4 is completed is used as the date and time when the match determination is performed. With respect to the first set of matching condition information, a plurality of times included in the time zone TZ-4 are used as the plurality of times in the match condition.

FIG. 24 is a table representing an example of a priority access flag associated with a change in the count of CS calls, the count of PS calls, and the count of HO calls of FIG. 19. In addition, in this example, as illustrated in FIG. 24, the first set of matching condition information has 1 as the priority access flag MDE-3 for each piece of target data TD-k used in the control of the HO call. In addition, in this example, as illustrated in FIG. 24, the first set of matching condition information has 0 as the priority access flag MDE-3 for each piece of target data TD-k used in the control of the CS call and the PS call.

With respect to the second set of second date and time condition information, the time at which the time zone TZ-1 is completed is used as the date and time when the match determination is performed. With respect to the second set of matching condition information, a plurality of times included in the time zone TZ-1 are used as the plurality of times in the match condition.

Further, in this example, as illustrated in FIG. 24, the second set of matching condition information has 1 as the priority access flag MDE-3 for each piece of target data TD-k used in the control of the CS call and the PS call. In addition, in this example, as illustrated in FIG. 24, the second set of matching condition information has 0 as the priority access flag MDE-3 for each piece of target data TD-k used in the control of the HO call.

With respect to the third set of second date and time condition information, the time at which the time zone TZ-2 is completed is used as the date and time when the match determination is performed. With respect to the third set of matching condition information, a plurality of times included in the time zone TZ-2 are used as the plurality of times in the match condition.

Further, in this example, as illustrated in FIG. 24, the third set of matching condition information has 1 as the priority access flag MDE-3 for each piece of target data TD-k used in the control of the CS call and the PS call. In addition, in this example, as illustrated in FIG. 24, the third set of matching condition information has 0 as the priority access flag MDE-3 for each piece of target data TD-k used in the control of the HO call.

With respect to the fourth set of second date and time condition information, the time at which the time zone TZ-3 is completed is used as the date and time when the match determination is performed. With respect to the fourth set of matching condition information, a plurality of times included in the time zone TZ-3 are used as the plurality of times in the match condition.

Further, in this example, as illustrated in FIG. 24, the fourth set of matching condition information has 1 as the priority access flag MDE-3 for each piece of target data TD-k used in the control of the PS call. In addition, in this example, as illustrated in FIG. 24, the fourth set of matching condition information has 0 as the priority access flag MDE-3 for each piece of target data TD-k used in the control of the CS call and HO call.

Figure 25:
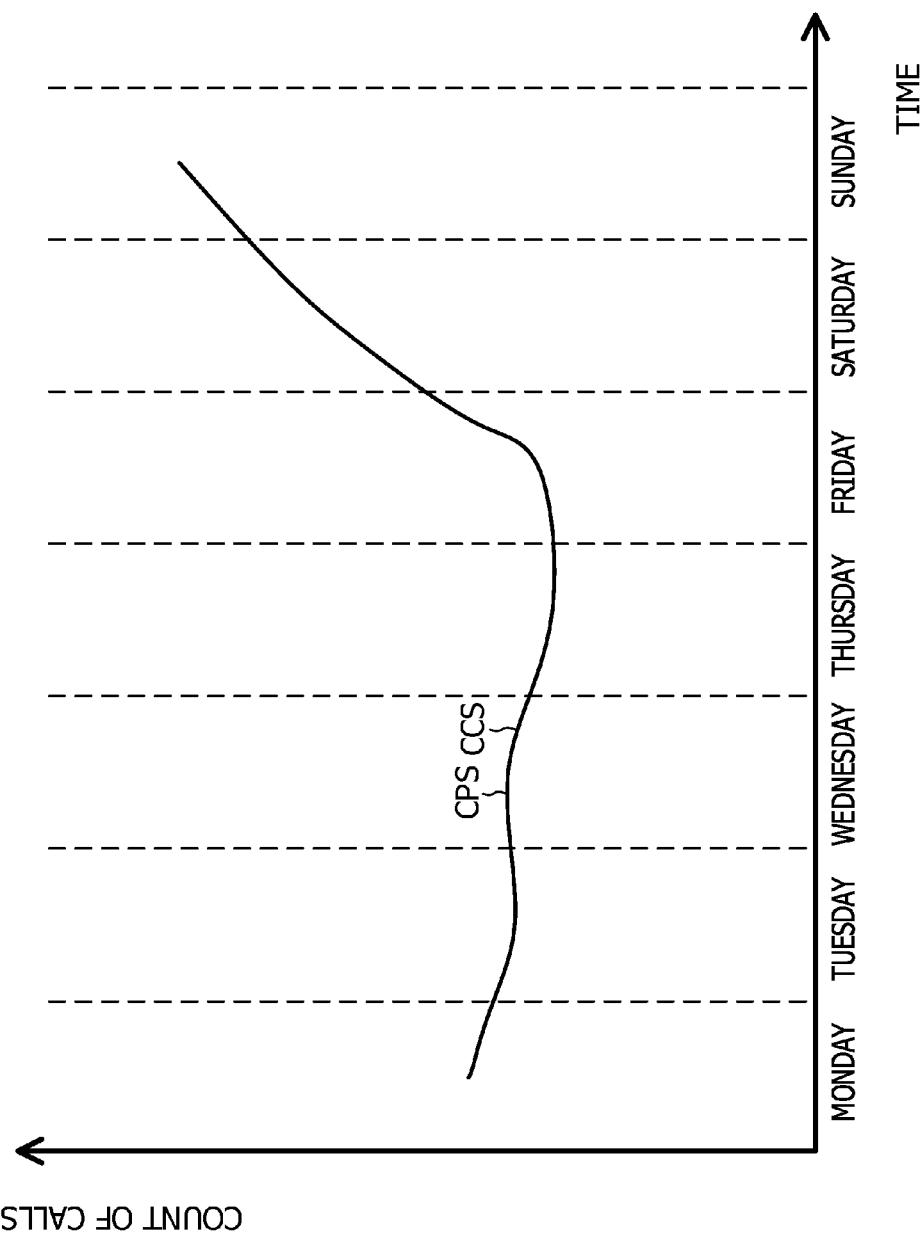
FIG. 25 is a graph representing an example of a change for a week in the count of CS calls and the count of PS calls.

The count of CS calls and the count of PS calls are likely to increase with the laps of time, in weekends. FIG. 25 is a graph representing an example of a change for a week in the count of CS calls and the count of PS calls. For example, the count of CS calls CCS and the count of PS calls CPS may vary for a week, as illustrated in FIG. 25. In this example, the fifth set is used in order to cope with the change for a week in the CS call and PS call.

With respect to the fifth set of second date and time condition information, Friday midnight (for example, 0:00) is used as the date and time the match determination is performed. With respect to the fifth set of matching condition information, as a plurality of times in the match condition, a plurality of times included in the time zone from the latest Wednesday midnight to Friday midnight.

Further, in this example, matching condition information of the fifth set has 1 as priority access flag MDE-3 for each piece of target data TD-k used in the control of the CS call and PS call. In addition, in this example, the fifth set of matching condition information has 0 as the priority access flag MDE-3 for each piece of target data TD-k used in the control of the HO call.

In addition, in the case where the process of FIG. 18 is executed on the fifth set, the match determination is performed based on the count of CS calls and the count of PS calls, without being based on the count of HO calls. In addition, in the case where the third initializing process is executed, the processor 131 may execute the first initializing process, at a predetermined timing (for example, such as Sunday midnight), by executing the process of FIG. 18 on the fifth set.

Figure 26:
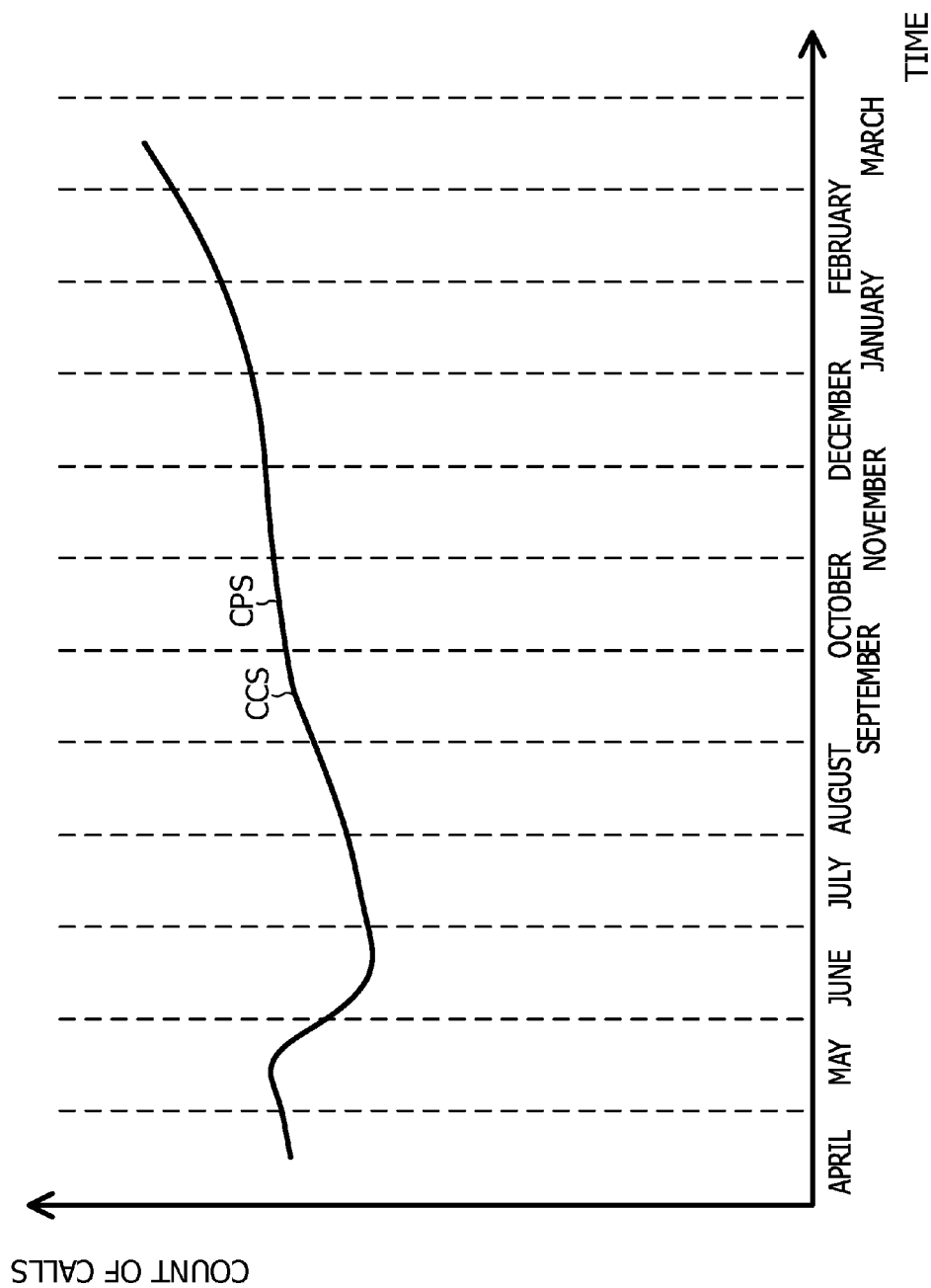
FIG. 26 is a graph representing an example of a change for a year in the count of CS calls and the count of PS calls.

The count of CS calls and the count of PS calls are likely to increase with the laps of time, in the period of December to March. FIG. 26 is a graph representing an example of a change for one year in the count of CS calls and the count of PS calls. For example, the count of CS calls CCS and the count of PS calls CPS may vary for one year, as illustrated in FIG. 26. In this example, the sixth set is used in order to cope with the change for one year in the CS call and PS call.

With respect to the sixth set of second date and time condition information, midnight (for example, 0:00) at November 30 is used as the date and time the match determination is performed. With respect to the sixth set of matching condition information, as a plurality of times in the match condition, a plurality of times included in the time zone from midnight of latest September 30 to midnight of November 30.

Further, in this example, the sixth set of matching condition information has 1 as priority access flag MDE-3 for each piece of target data TD-k used in the control of the CS call and PS call. In addition, in this example, the sixth set of matching condition information has 0 as the priority access flag MDE-3 for each piece of target data TD-k used in the control of the HO call.

In addition, in the case where the process of FIG. 18 is executed on the sixth set, the match determination is performed based on the count of CS calls and the count of PS calls, without being based on the count of HO calls. In addition, in the case where the third initializing process is executed, the processor 131 may execute the first initializing process, at a predetermined timing (for example, such as midnight at March 31), by executing the process of FIG. 18 on the sixth set.

In a case where it is restarted, the processor 131 executes the process of FIG. 14 again. In this case, since the initializing process flag that is stored in the non-volatile memory 133 represents the third initializing process. Accordingly, the processor 131 determines the results as "No" and "Yes" in steps S102 and S103 of FIG. 14, respectively, and executes the third initializing process (step S106 in FIG. 14). Then, the processor 131 ends the process of FIG. 14.

Figure 27:
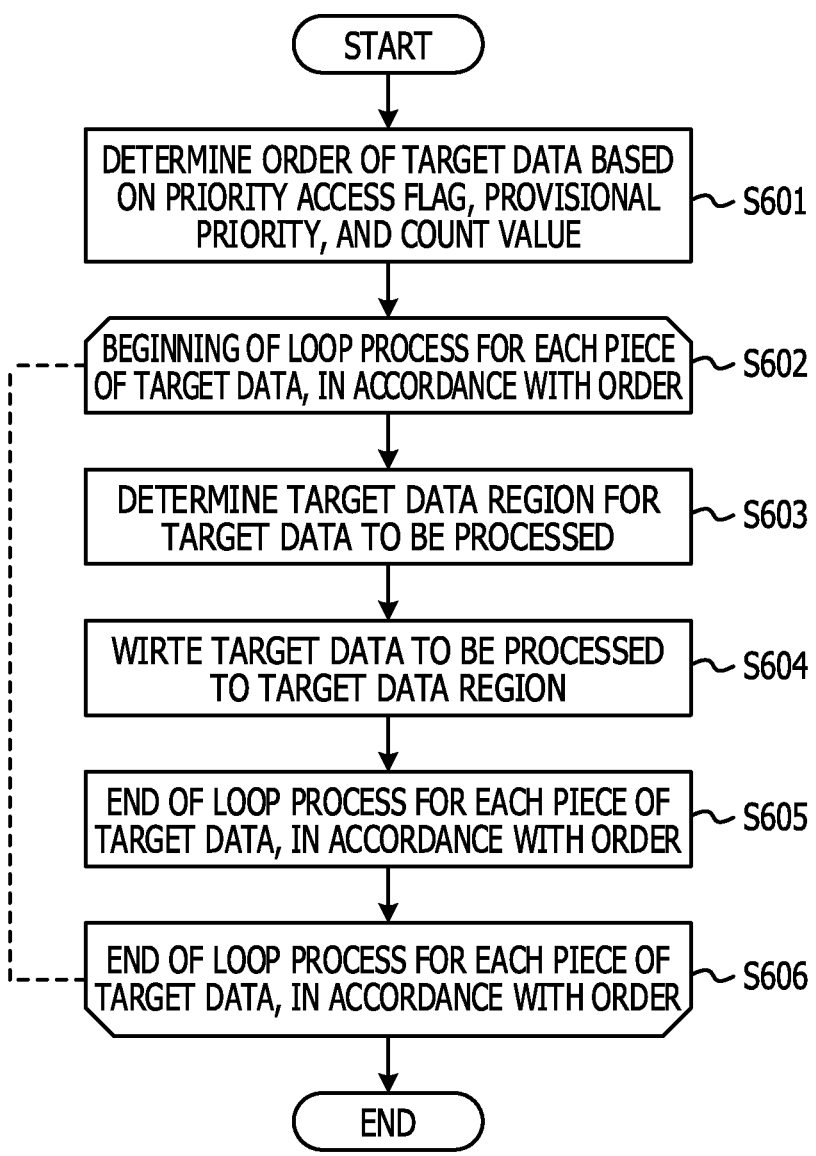
FIG. 27 is a flowchart illustrating an example of the process that the processor in FIG. 3 executes.

FIG. 27 is a flowchart illustrating an example of a process that the processor in FIG. 3 executes. In this example, the processor 131 executes the process represented by the flowchart in FIG. 27, as a process to store the target data TD-k in the volatile memory 132, in the third initializing process.

The processor 131 determines the order of K pieces of target data TD-1, . . . , TD-K, based on the provisional priority MDE-1, the count value MDE-2, and the priority access flag MDE-3, which are stored in the non-volatile memory 133 (step S601 in FIG. 27).

In this example, in the determined order, the target data TD-i for which the priority access flag MDE-3 is set to 1 is positioned closer to the top than the target data TD-j for which the priority access flag MDE-3 is set to 0. Further, in the determined order, the target data TD-k for which the priority access flag MDE-3 is set to 1 is positioned closer to the top, as the provisional priority MDE-1 becomes high. Further, in the determined order, each of a plurality of pieces of target data TD-k for which the priority access flag MDE-3 is set to 1 and the provisional priority MDE-1 is the same is positioned closer to the top, as the count value MDE-2 increases.

The processor 131 executes the loop process for each piece of target data TD-1, . . . , TD-K, in accordance with the determined order. The beginning of the loop process is step S602, and the end of the loop process is step S606. In this example, the target data TD-k which is the target of the loop process is represented as the target data TD-k to be processed.

The loop process will be further described. The processor 131 determines the target data region, which is a region in which the target data TD-k to be processed is stored, in the volatile memory 132 (step S603 in FIG. 27). The target data region to be determined is a region starting from the address of the beginning of the target data region group TDR, at the time of the first execution of the loop process, and having the same size as that of the target data TD-k to be processed. The target data region to be determined is a region starting from an address following the target data region that is determined by the loop process which is executed immediately before, at the time of the second and subsequent execution of the loop process, and having the same size as that of the target data TD-k to be processed.

Next, the processor 131 writes the target data TD-k to be processed, to the determined target data region (step S604 in FIG. 27). The processor 131 writes region data representing the determined target data region, to the region data region included in the region in which the management data MD-k associated with the target data TD-k to be processed is stored, in the volatile memory 132. Thus, the processor 131 updates the region data associated with the target data TD-k to be processed (step S605 in FIG. 27). Thus, the processor 131 executes the loop process.

Then, the processor 131 ends the process of FIG. 27, after executing the loop process for each piece of the target data TD-1, . . . , TD-K, in accordance with the determined order.

Thus, in the volatile memory 132, the region for storing the target data TD-i for which the priority access flag MDE-3 is set to 1 is positioned closer to the top than the region for storing the target data TD-j for which the priority access flag MDE-3 is set to 0. Further, in the volatile memory 132, the region for storing the target data TD-k for which the priority access flag MDE-3 is set to 1 is positioned closer to the top, as the provisional priority MDE-1 becomes high.

In addition, in the volatile memory 132, the regions for respectively storing a plurality of pieces of target data TD-k for which the priority access flag MDE-3 is set to 1 and the provisional priority MDE-1 is the same are positioned closer to the top, as the count value MDE-2 increases.

Figure 28:
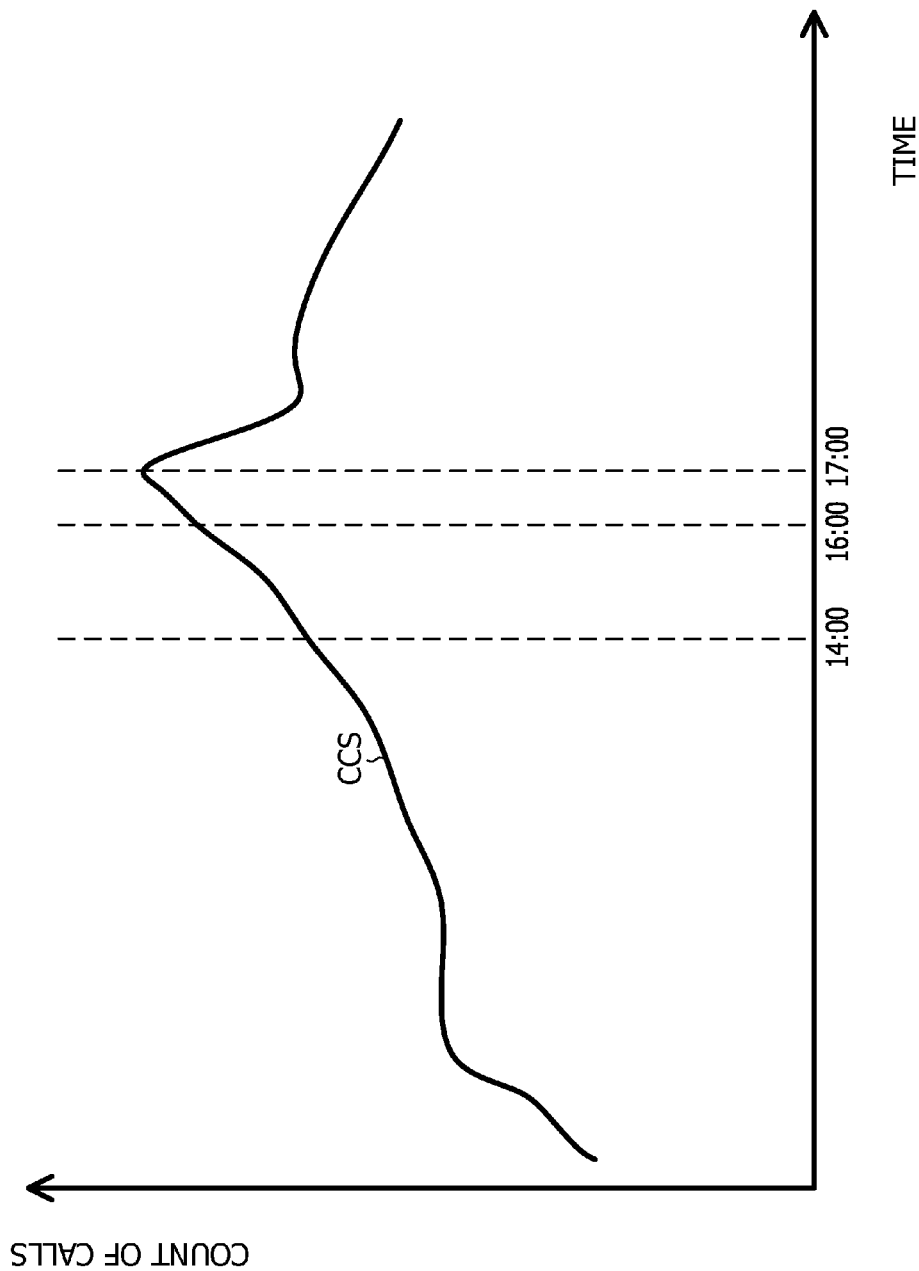
FIG. 28 is a graph representing an example of a change for a day in the count of CS calls.
Figure 29:
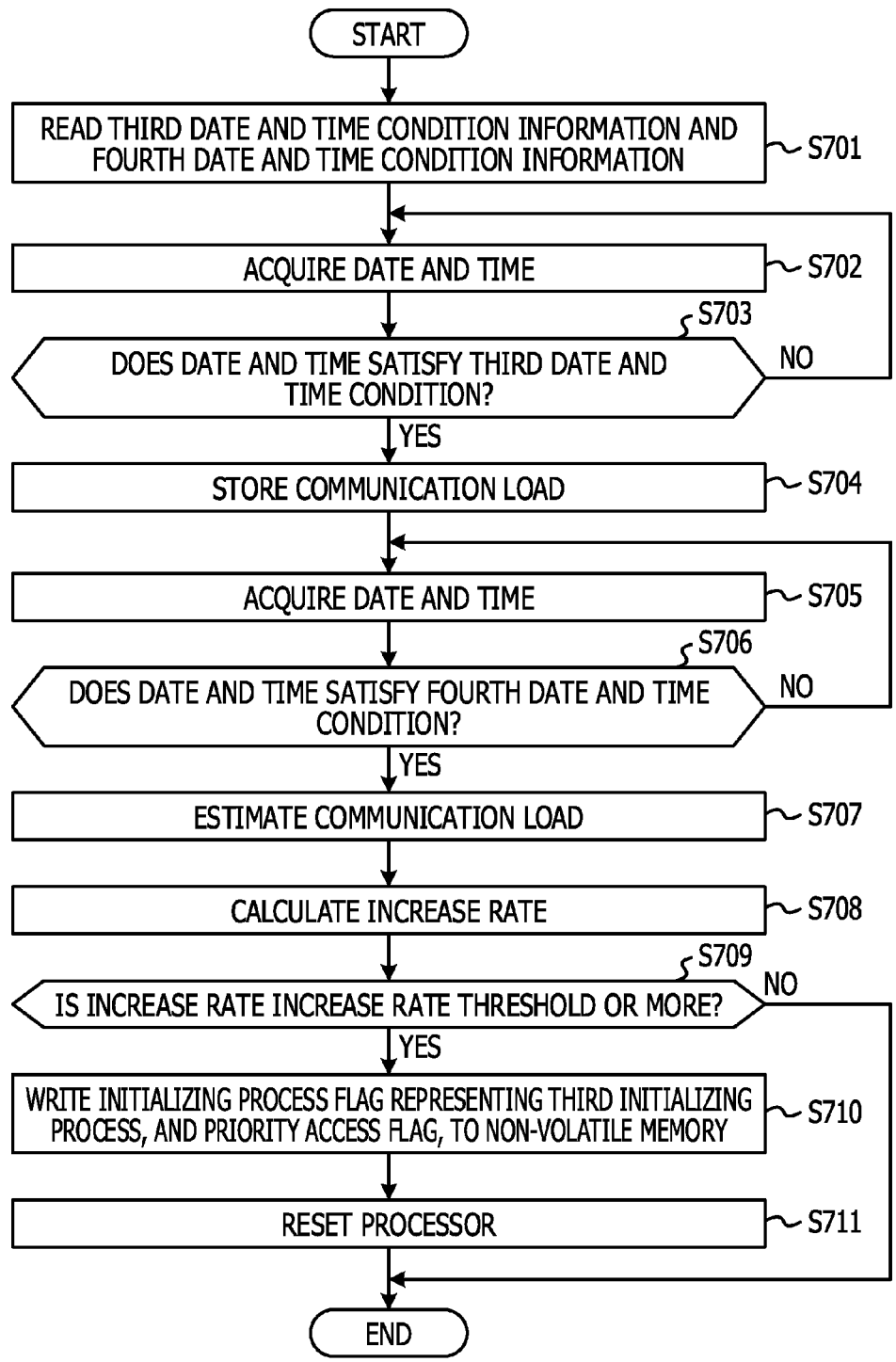
FIG. 29 is a flowchart illustrating an example of the process that the processor in FIG. 3 executes.

FIG. 28 is a graph representing an example of a change for a day in the count of CS calls. For example, the CS call increases rapidly as it approaches to a specific time (in other words, reference time, in this example, 17:00), as illustrated in FIG. 28. The above change is likely to occur, in a case where an event such as a concert is held in the above-mentioned time. FIG. 29 is a flowchart illustrating an example of a process that the processor in FIG. 3 executes. In this example, in order to cope with the above-mentioned change, the processor 131 executes the process represented by the flowchart in FIG. 29.

The processor 131 reads the third and fourth date and time condition information pieces which are stored in the volatile memory 132 (step S701 in FIG. 29). The third and fourth date and time condition information pieces respectively represent the third and fourth date and time conditions.

The third date and time condition is a condition that the current date and time are the first date and time (in other words, first basic date and time) which are the basis for calculating an increase rate which will be described later. In this example, the communication load is the count of CS calls in the communication between the base station device 10 and the mobile station device 20. The first basic date and time is date and time which is earlier than the reference time by a predetermined time (in this example, 3 hours). In this example, the processor 131 stores the reference time in advance. In addition, the reference time may be input by the user of the base station device 10.

The fourth date and time condition are a condition that the current date and time are the second date and time (in other words, second basic date and time) which become the basis for calculation of the increase rate which will be described later. The second basic date and time are date and time which are later than the first basic date and time, and earlier than the reference time by a predetermined time (in this example, one hour).

Next, the processor 131 acquires the current date and time (step S702 in FIG. 29). Then, the processor 131 determines whether or not the acquired date and time satisfies the third date and time condition represented by the read third date and time condition information (step S703 in FIG. 29).

In a case where the acquired date and time do not satisfy the third date and time condition, the processor 131 determines the result as "No", returns to step S702, and repeatedly executes the process of step S702 and step S703.

In a case where the date and time satisfy the third date and time condition, the processor 131 determines the result as "Yes", and stores the communication load in the volatile memory 132 (step S704 in FIG. 29). Next, the processor 131 acquires the current date and time (step S705 in FIG. 29). Then, the processor 131 determines whether or not the acquired date and time satisfies the fourth date and time condition represented by the read fourth date and time condition information (step S706 in FIG. 29).

In a case where the acquired date and time do not satisfy the sixth date and time condition, the processor 131 determines the result as "No", returns to step S705, and repeatedly executes the process of step S705 and step S706.

In a case where the acquired date and time satisfy the fourth date and time condition, the processor 131 determines the result as "Yes", and estimates the communication load at a reference time (step S707 in FIG. 29). In this example, the processor 131 estimates the communication load at the reference time, based on the regression line represented by Expression 1.

$$y = ax + b \quad \text{Expression 1}$$

y represents a communication load, and x represents a time. a and b are represented by Expression 2 and Expression 3.

$$a = \frac{N \sum_{n=1}^{N} x_n y_n - \sum_{n=1}^{N} x_n \sum_{n=1}^{N} y_n}{N \sum_{n=1}^{N} x_n^2 - \left(\sum_{n=1}^{N} x_n\right)^2} \quad \text{Expression 2}$$

$$b = \frac{\sum_{n=1}^{N} x_n^2 \sum_{n=1}^{N} y_n - \sum_{n=1}^{N} x_n \sum_{n=1}^{N} x_n y_n}{N \sum_{n=1}^{N} x_n^2 - \left(\sum_{n=1}^{N} x_n\right)^2} \quad \text{Expression 3}$$

N represents the number of the communication loads acquired during the period from the first basic date and time to the second basic date and time. $y_n$ represents the n-th communication load acquired during the period from the first basic date and time to the second basic date and time. n represents each integer of 1 to N. $x_n$ represents the n-th date and time when the communication load is acquired, during the period from the first basic date and time to the second basic date and time.

Next, the processor 131 calculates the increase rate α of the communication load, based on Expression 4, the communication load $Y_1$ which is stored in the first basic date and time, and the estimated communication load $Y_2$, (step S708 in FIG. 29).

$$\alpha = 100 \frac{Y_2 - Y_1}{Y_1} \quad \text{Expression 4}$$

Next, the processor 131 whether or not the calculated increase rate α is a predetermined increase rate threshold (for example, 30%) or more (step S709 in FIG. 29). In this example, the processor 131 stores the increase rate threshold in advance. In addition, the increase rate threshold may be input by the user of the base station device 10.

In a case where the increase rate α is equal to or greater than the increase rate threshold, the processor 131 determines the result as "Yes" and the process proceeds to step S710. Then, the processor 131 writes the initializing process flag representing the third initializing process, and the priority access flag MDE-3 which is predetermined for each piece of target data TD-k, to the non-volatile memory 133 (step S710 in FIG. 29).

In this example, the processor 131 uses 1 as the priority access flag MDE-3 for each piece of the target data TD-k which is used for control of the CS call. In addition, the processor 131 uses 0 as the priority access flag MDE-3 for each piece of the target data TD-k which is used for control of the PS call and HO call.

Then, the processor 131 resets (in other words, restart) the processor 131 (step S711 in FIG. 29). Thus, the processor 131 ends the process of FIG. 29. Incidentally, in a case where the increase rate α is smaller than the increase rate threshold, the processor 131 determines the result as "No" in step S709, and ends the process of FIG. 29, without resetting the processor 131.

Figure 30:
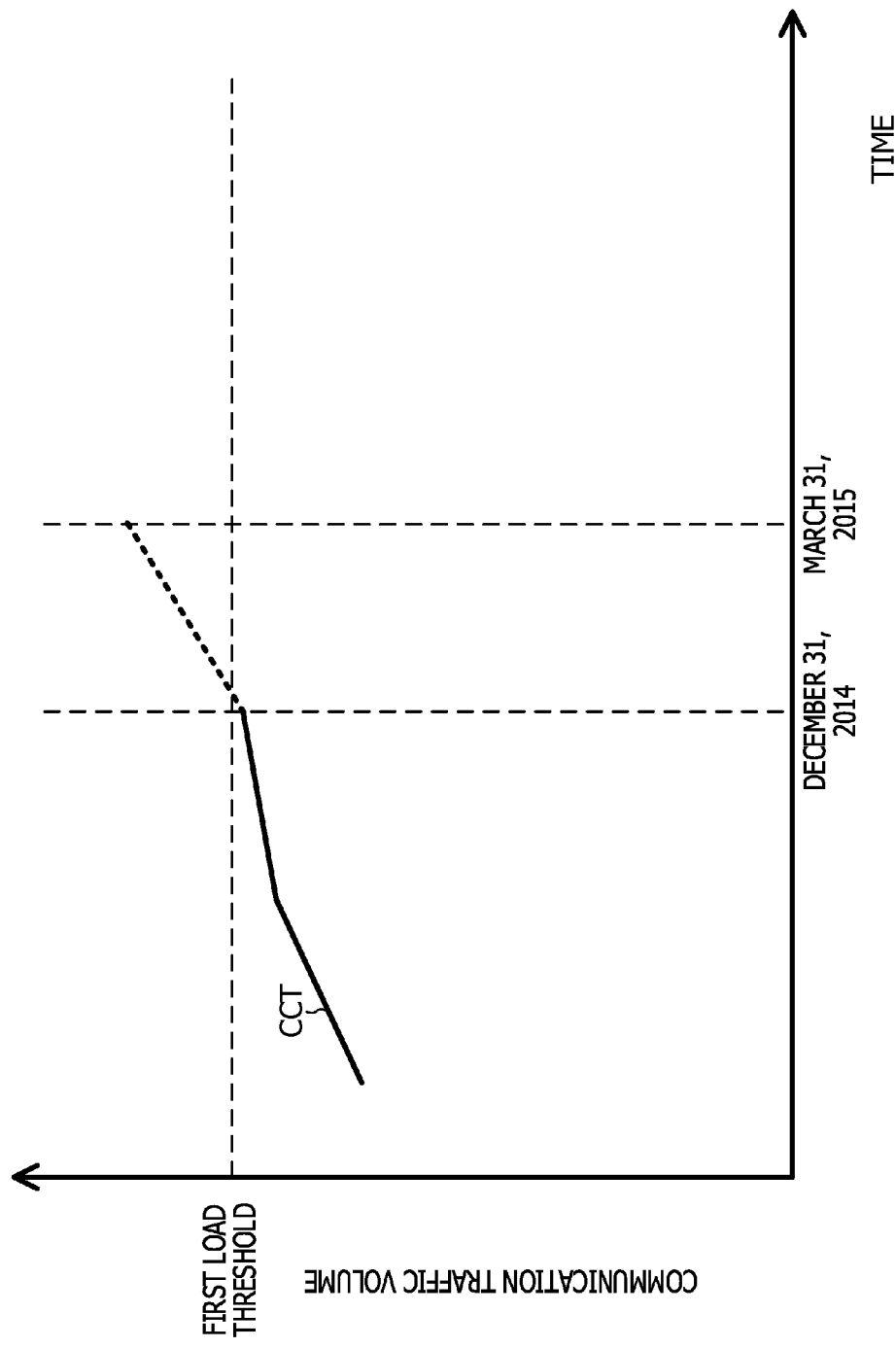
FIG. 30 is a graph representing an example of a change in the communication traffic volume over time in the CS call.
Figure 31:
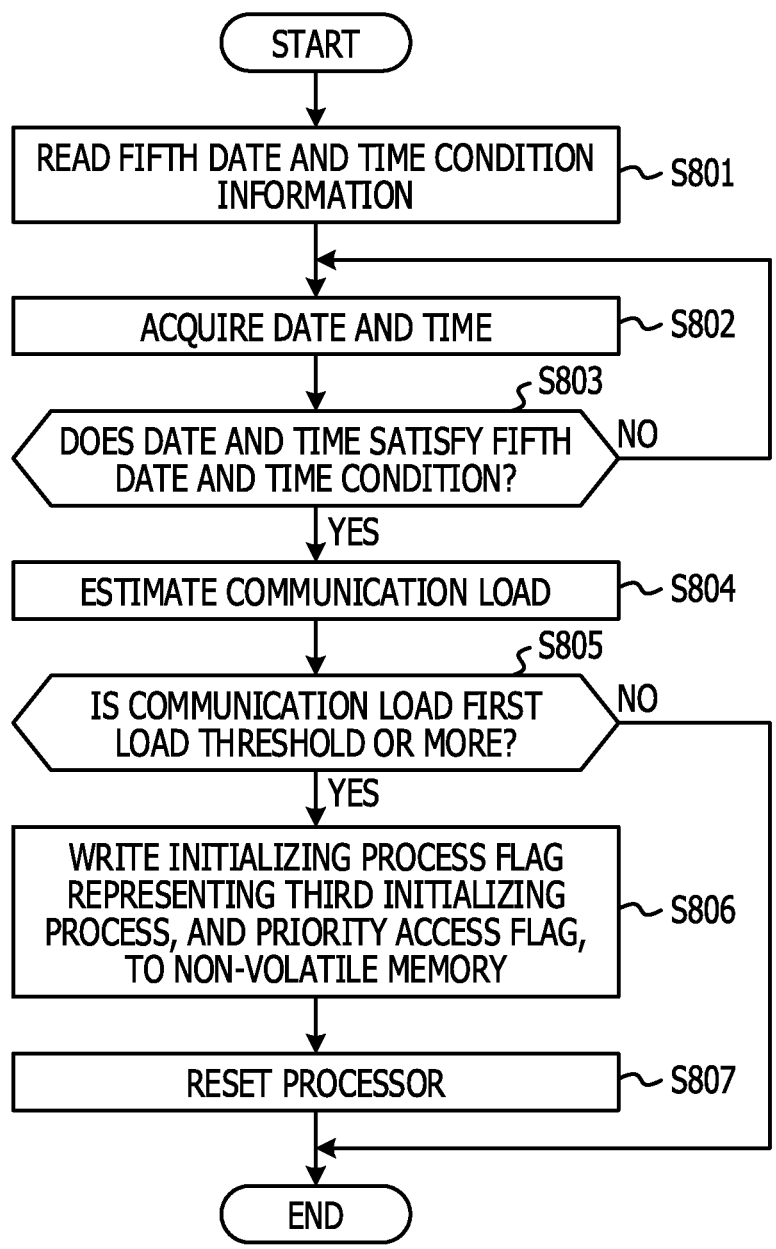
FIG. 31 is a flowchart illustrating an example of the process that the processor in FIG. 3 executes.

FIG. 30 is a graph representing an example of a change in the communication traffic volume over time in the CS call. In addition, for example, the communication traffic volume in the CS call may be increased, as illustrated in FIG. 30. The above-mentioned increase is likely to occur in a case where the number of mobile station devices 20 located in the cell that is formed by the base station device 10 is increased. FIG. 31 is a flowchart illustrating an example of a process that the processor in FIG. 3 executes. In this example, in order to cope with the above-mentioned increase, the processor 131 executes the process represented by the flowchart in FIG. 31.

The processor 131 reads the fifth date and time condition information which is stored in the volatile memory 132 (step S801 in FIG. 31). The fifth date and time condition information represents the fifth date and time condition. The fifth date and time condition is a condition that the current date and time are date and time when a determination is made as to whether the communication load is the first load threshold or more (in other words, the determination date and time, in this example, Dec. 31, 2014). In this example, the communication load is a communication traffic volume in the CS call of the communication between the base station device 10 and the mobile station device 20. In this example, the processor 131 stores the determination date and time in advance. In addition, the determination date and time may be input by the user of the base station device 10.

Next, the processor 131 acquires the current date and time (step S802 in FIG. 31). Then, the processor 131 determines whether or not the acquired date and time satisfies the fifth date and time condition represented by the read fifth date and time condition information (step S803 in FIG. 31).

In a case where the acquired date and time do not satisfy the fifth date and time condition, the processor 131 determines the result as "No", returns to step S802, and repeatedly executes the process of step S802 and step S803.

In a case where the acquired date and time satisfy the fifth date and time condition, the processor 131 determines the result as "Yes", and estimates the communication load at a time (in other words, estimation time) later than the current time by a predetermined time (in this example, three months) (step S804 in FIG. 31). In this example, the processor 131 estimates the communication load at the estimation time, similar to step S707 of FIG. 29, based on the regression line represented by Expression 1.

Next, the processor 131 whether or not the estimated communication load is a predetermined first load threshold or more (step S805 in FIG. 31). In this example, the processor 131 stores the first load threshold in advance. In addition, the first load threshold may be input by the user of the base station device 10.

In a case where the estimated communication load is equal to or greater than the first load threshold, the processor 131 determines the result as "Yes" and the process proceeds to step S806. Then, the processor 131 writes the initializing process flag representing the third initializing process, and the priority access flag MDE-3 which is predetermined for each piece of target data TD-k, to the non-volatile memory 133 (step S806 in FIG. 31).

In this example, the processor 131 uses 1 as the priority access flag MDE-3 for each piece of the target data TD-k which is used for control of the CS call. In addition, the processor 131 uses 0 as the priority access flag MDE-3 for each piece of the target data TD-k which is used for control of the PS call and HO call.

Then, the processor 131 resets (in other words, restart) the processor 131 (step S807 in FIG. 31). Thus, the processor 131 ends the process of FIG. 31. Meanwhile, in a case where the estimated communication load is smaller than the first load threshold, the processor 131 determines the result as "No" in step S805, and ends the process of FIG. 31, without resetting the processor 131.

Figure 32:
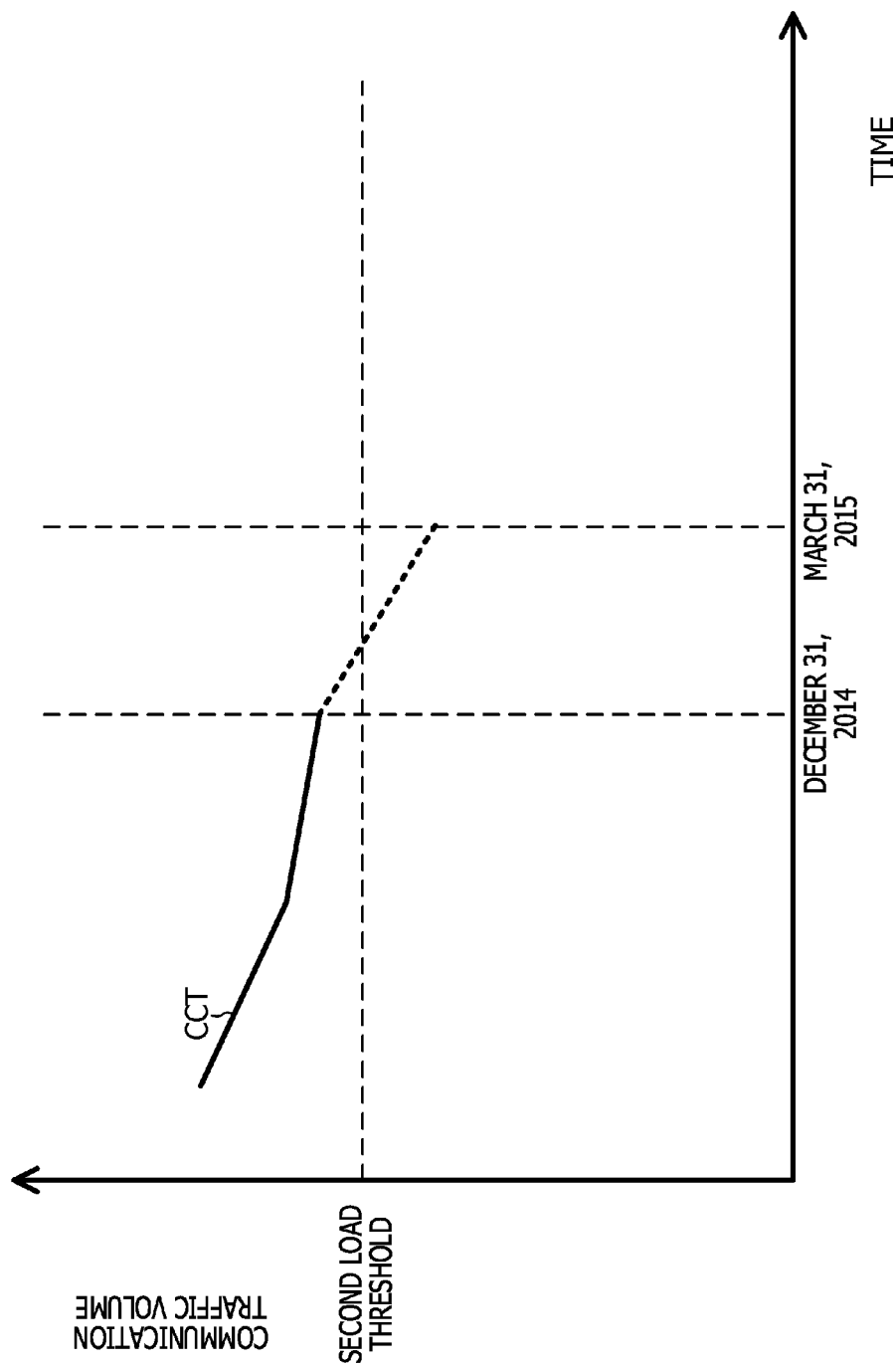
FIG. 32 is a graph representing an example of a change in the communication traffic volume over time in the CS call.
Figure 33:
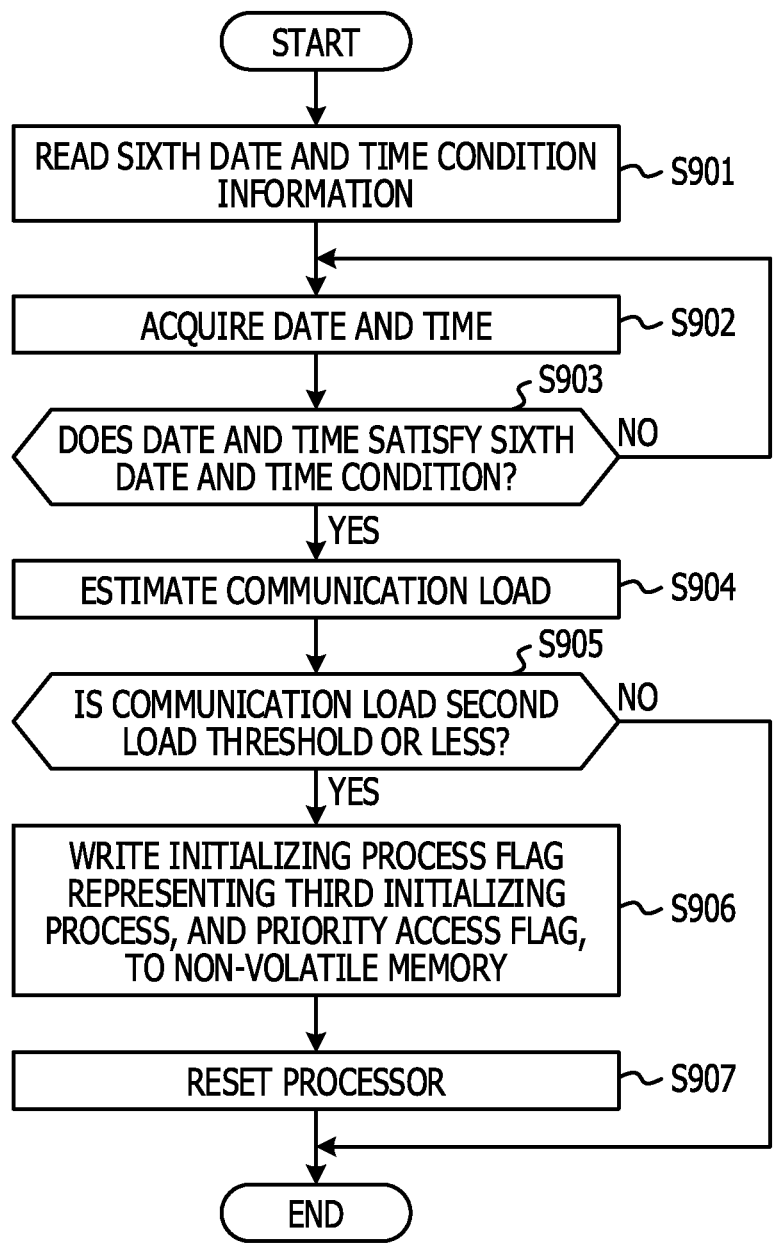
FIG. 33 is a flowchart illustrating an example of the process that the processor in FIG. 3 executes.

FIG. 32 is a graph representing an example of a change in the communication traffic volume over time in the CS call. In addition, for example, the communication traffic volume in the CS call may be reduced, as illustrated in FIG. 32. The above-mentioned reduction is likely to occur in a case where the number of mobile station devices 20 located in the cell that is formed by the base station device 10 is reduced. FIG. 33 is a flowchart illustrating an example of a process that the processor in FIG. 3 executes. In this example, in order to cope with the above-mentioned decrease, the processor 131 executes the process represented by the flowchart in FIG. 33.

The processor 131 reads the sixth date and time condition information which is stored in the volatile memory 132 (step S901 in FIG. 33). The sixth date and time condition information represents the sixth date and time conditions. The sixth date and time condition is a condition that the current date and time are date and time when a determination is made as to whether the communication load is the second load threshold or less (in other words, the determination date and time, in this example, Dec. 31, 2014). In this example, the communication load is a communication traffic volume in the CS call of the communication between the base station device 10 and the mobile station device 20. In this example, the processor 131 stores the determination date and time in advance. In addition, the determination date and time may be input by the user of the base station device 10. In addition, the determination date and time may be different from the determination date and time which is used in the process of FIG. 31.

Next, the processor 131 acquires the current date and time (step S902 in FIG. 33). Then, the processor 131 determines whether or not the acquired date and time satisfies the sixth date and time condition represented by the read sixth date and time condition information (step S903 in FIG. 33).

In a case where the acquired date and time do not satisfy the sixth date and time condition, the processor 131 determines the result as "No", returns to step S902, and repeatedly executes the process of step S902 and step S903.

In a case where the acquired date and time satisfy the sixth date and time condition, the processor 131 determines the result as "Yes", and estimates the communication load at a time (in other words, estimation time) later than the current time by a predetermined time (in this example, three months) (step S904 in FIG. 33). In this example, the processor 131 estimates the communication load at the estimation time, similar to step S707 of FIG. 29, based on the regression line represented by Expression 1.

Next, the processor 131 whether or not the estimated communication load is a predetermined second load threshold or more (step S905 in FIG. 33). In this example, the processor 131 stores the second load threshold in advance. In addition, the second load threshold may be input by the user of the base station device 10.

In a case where the estimated communication load is the second load threshold or less, the processor 131 determines the result as "Yes", the process proceeds to step S906. Then, the processor 131 writes the initializing process flag representing the third initializing process, and the priority access flag MDE-3 which is predetermined for each piece of target data TD-k, to the non-volatile memory 133 (step S906 in FIG. 33).

In this example, the processor 131 uses 1 as the priority access flag MDE-3 for each piece of the target data TD-k which is used for control of the CS call. In addition, the processor 131 uses 0 as the priority access flag MDE-3 for each piece of the target data TD-k which is used for control of the PS call and HO call.

Then, the processor 131 resets (in other words, restart) the processor 131 (step S907 in FIG. 33). Thus, the processor 131 ends the process of FIG. 33. Meanwhile, in a case where the estimated communication load is greater than the second load threshold, the processor 131 determines the result as "No" in step S905, and ends the process of FIG. 33, without resetting the processor 131.

As described above, in the base station device 10 of the first embodiment, the processor 131 stores the target data group in the target data region group TDR, and stores the management data group representing the target data region group TDR in the management data region group MDR. In addition, the processor 131 holds information representing the management data region group MDR, and accesses the target data included in the target data group based on the information.

According to this, in a case where the region for storing the target data included in the target data group is changed, the processor 131 can change the management data such that the management data included in the management data group represents the region after the change. Thus, the processor 131 can appropriately access the target data included in the target data group, based on the held information. Thus, since it is possible to change the region for storing each piece of target data included in the target data group based on the frequency of accessing the target data, the processor 131 can rapidly access the target data.

Furthermore, in the base station device 10 of the first embodiment, the processor 131 determines a plurality of regions for storing a plurality of pieces of target data that are included in the target data group, respectively, and stores the plurality of pieces of target data that are included in the target data group, in the determined plurality of regions, respectively. In addition, the processor 131 stores the plurality of pieces of data representing the determined plurality of regions, in the plurality of regions that are respectively associated with the plurality of pieces of target data included in the target data group, and included in the management data region group MDR.

According to this, the processor 131 changes the region for storing the target data included in the target data group, and changes the management data such that the management data included in the management data group represents the region after the change. Thus, the processor 131 can appropriately access the target data included in the target data group, based on the held information. Accordingly, since it is possible to change the region for storing each piece of target data included in the target data group based on the frequency of accessing the target data, the processor 131 can rapidly access the target data.

Furthermore, in the base station device 10 of the first embodiment, the plurality of regions that are determined for the plurality of pieces of target data included in the target data group are included in the target data region group TDR.

According to this, it is possible to suppress a useless increase of the region that the processor 131 uses.

Every time a predetermined period has elapsed, the base station device 10 of the first embodiment determines a plurality of regions.

According to this, the region for storing the target data included in the target data group is changed, depending on the change over time in the frequency of accessing the target data. As a result, the processor 131 can rapidly access the target data.

Furthermore, in the base station device 10 of the first embodiment, the processor 131 determines the plurality of regions for each of the plurality of pieces of target data included in the target data group, based on the number of times at which the target data is accessed.

According to this, the region for storing the target data included in the target data group is changed, depending on the number of times at which the target data is accessed. As a result, the processor 131 can rapidly access the target data.

Further, in the base station device 10 of the first embodiment, the processor 131 determines a plurality of regions, based on the communication load between the base station device 10 and the mobile station device 20.

The correlation between the communication load between the base station device 10 and the mobile station device 20, and the frequency of accessing the target data is likely to be stronger. Therefore, according to the base station device 10, based on the load, the region for storing the target data that is included in the target data group is appropriately changed. As a result, the processor 131 can rapidly access the target data.

Furthermore, in the base station device 10 of the first embodiment, the processor 131 determines the plurality of regions, depending on a change over time in the load, based on the priority determined for each of the plurality of pieces of target data included in the target data group.

A correlation between the change over time in the load up to a certain time, and the load later than the time is likely to be strong. Therefore, according to the base station device 10, the region for storing the target data included in the target data group is appropriately changed, based on the priority corresponding to the change over time in the load. As a result, the processor 131 can rapidly access the target data.

Furthermore, in the base station device 10 of the first embodiment, the processor 131 determines whether or not the load in each of a plurality of times is within a predetermined range centered on the reference value that is determined for the time. Further, in a case where the determination is positive, the processor 131 determines a plurality of regions, based on the priority determined for each of the plurality of pieces of target data included in the target data group.

The load is likely to fluctuate. Therefore, according to the base station device 10, since the change over time in the load is properly reflected in the priority, the region for storing the target data included in the target data group is appropriately changed. As a result, the processor 131 can rapidly access the target data.

In the first embodiment, the process of FIG. 18 is executed for each of the matching condition information and the second date and time condition information of six sets. In addition, the process of FIG. 18 is executed for each of the matching condition information and the second date and time condition information of m sets out of six sets, and may not be executed for the matching condition information and the second date and time condition information of remaining sets. m represents each integer of 1 to 5.

In addition, the processor 131 executes one of the second initializing process, and the third initializing process, and may not execute the other. In addition, the processor 131 executes p processes out of five processes of FIG. 16, FIG. 18, FIG. 29, FIG. 31, and FIG. 33, and may not the remaining processes. p represents each integer of 1 to 4.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
   a memory including a first portion and a second portion, the first portion including a plurality of regions storing a plurality of data respectively; and
   a processor coupled to the memory, the processor including a cache memory and configured to:
   count a number of accessing to the plurality of data stored in the plurality of regions of the first portion of the memory respectively,
   execute a rearrangement process of the plurality of data such that the plurality of data are stored in the plurality of regions of the memory respectively in descending order according to the number of accessing,
   generate management data indicating that the plurality of data are stored in which region of the plurality of regions respectively after the rearrangement process,
   store the management data in the second portion of the memory,
   in response to a request to read first data of the plurality of data, access the management data stored in the second portion of the memory,
   read, based on the management data, the first data stored in a first region of the plurality of regions, and
   store, in the cache memory of the processor, the first data read from the first region of the plurality of regions and second data read from a second region of the plurality of regions next to the first region.

2. The information processing apparatus according to claim 1, wherein
   the processor is further configured to:
   delete, from the cache memory, data that is earliest stored in the cache memory, when a capacity of the cache memory is insufficient for storing new data.

3. The information processing apparatus according to claim 2, wherein the processor is further configured to, when the first data is stored in the cache memory, access the first data in the cache memory in response to the request to read the first data.

4. The information processing apparatus according to claim 1, wherein the processor is further configured to determine the first region for storing the first data based on an access frequency to the first data.

5. The information processing apparatus according to claim 1, wherein the processor is further configured to determine the first region every time a certain period of time has elapsed.

6. The information processing apparatus according to claim 5, wherein the processor is further configured to determine the first region, based on a priority determined for the first data, when the load in each of a plurality of times is within a certain range centered on a reference value that is determined for each of the plurality of times.

7. The information processing apparatus according to claim 1, wherein the processor is further configured to determine the first region, based on a number of times the first data is accessed.

8. The information processing apparatus according to claim 1, wherein:
   the information processing apparatus includes a base station, and
   the processor is further configured to determine the first region, based on a load on the information processing apparatus for communications with a mobile station.

9. The information processing apparatus according to claim 8, wherein the processor is further configured to determine the first region, based on a priority determined for the first data, in response to a change over time in the load.

10. A data accessing method using a memory and a processor coupled to the memory, the processor including a cache memory, the memory including a first portion and a second portion, the first portion including a plurality of regions storing a plurality of data respectively, the data accessing method comprising:
    counting a number of accessing to the plurality of data stored in the plurality of regions of the first portion of the memory respectively;
    executing a rearrangement process of the plurality of data such that the plurality of data are stored in the plurality of regions respectively in descending order according to the number of accessing;
    generating management data indicating that the plurality of data are stored in which region of the plurality of regions respectively after the rearrangement process;
    storing the management data in the second portion of the memory;
    in response to a request to read first data of the plurality of data, accessing the management data stored in the second portion;
    reading, based on the management data, the first data stored in a first region of the plurality of regions; and
    storing, in the cache memory of the processor, the first data read from the first region of the plurality of regions and second data read from a second region of the plurality of regions next to the first region.

11. The data accessing method according to claim 10, further comprising:
    deleting, from the cache memory, data that is earliest stored in the cache memory, when a capacity of the cache memory is insufficient for storing new data.

12. The data accessing method according to claim 11, further comprising:
    when the first data is stored in the cache memory, accessing the first data in the cache memory in response to the request to read the first data stored.

13. The data accessing method according to claim 10, further comprising:
    determining the first region for storing the first data based on an access frequency to the first data.

14. The data accessing method according to claim 10, further comprising:
    determining the first region every time a certain period of time has elapsed.

15. The data accessing method according to claim 14, wherein the determining of the first region is executed based on a priority determined for the first data, when a load in each of a plurality of times is within a certain range centered on a reference value that is determined for each of the plurality of times.

16. The data accessing method according to claim 10, further comprising:
   determining the first region, based on a number of times the first data is accessed.

17. The data accessing method according to claim 10, wherein the first memory and the processor are included in a base station, and the data accessing method further comprises determining the first region, based on a load on the base station for communications with a mobile station.

18. The data accessing method according to claim 17, wherein the determining of the first region is executed based on a priority determined for the first data in response to a change over time in the load.

* * * * *